US012703413B2

(12) United States Patent
Cook et al.

(10) Patent No.: US 12,703,413 B2
(45) Date of Patent: Aug. 11, 2026

(54) AUTOMATED LOADING AND UNLOADING APPARATUS

(71) Applicant: Dimension Product Solutions LP, Crosby, TX (US)

(72) Inventors: George T. Cook, Crosby, TX (US); Burt Lusk, La Porte, TX (US)

(73) Assignee: Dimension Product Solutions LP, Crosby, TX (US)

( * ) Notice: Subject to any disclaimer, the term of this patent is extended or adjusted under 35 U.S.C. 154(b) by 249 days.

(21) Appl. No.: 18/740,460

(22) Filed: Jun. 11, 2024

(65) Prior Publication Data

US 2025/0376204 A1 Dec. 11, 2025

(51) Int. Cl.

| | |
|---|---|
| ***B62B 3/06*** | (2006.01) |
| ***B62B 1/14*** | (2006.01) |
| ***B65G 67/20*** | (2006.01) |
| ***B65G 67/24*** | (2006.01) |
| ***B66F 9/12*** | (2006.01) |

(52) U.S. Cl.

CPC .......... *B62B 3/0618* (2013.01); *B62B 3/0612* (2013.01); *B65G 67/20* (2013.01); *B65G 67/24* (2013.01); *B66F 9/122* (2013.01); *B62B 1/14* (2013.01)

(58) Field of Classification Search

CPC . B66F 9/12; B66F 9/122; B65G 67/20; B65G 67/24; B62B 3/0612; B62B 3/0618

See application file for complete search history.

(56) References Cited

U.S. PATENT DOCUMENTS

| | | | |
|---|---|---|---|
| 3,610,580 | A | 10/1971 | Johnstone |
| 11,299,348 | B1 | 4/2022 | Bhardwaj et al. |
| 2005/0034908 | A1 | 2/2005 | Raetze et al. |
| 2015/0016940 | A1 | 1/2015 | Budd et al. |

(Continued)

FOREIGN PATENT DOCUMENTS

| | | | |
|---|---|---|---|
| EP | 1760032 | A2 | 3/2007 |
| EP | 2581292 | A1 | 4/2013 |

(Continued)

OTHER PUBLICATIONS

International Patent Application PCT/US2025/033001: International Search Report and Written Opinion, Aug. 26, 2025 (20 pages).

*Primary Examiner* — Alexander K Garlen

(74) *Attorney, Agent, or Firm* — Greer, Burns & Crain, Ltd

(57) ABSTRACT

A loading and unloading apparatus that includes a transport assembly and a lift assembly including a plurality of support members, where each of the support members is attached to the transport assembly and includes an actuator plate. A plurality of roller assemblies are movably attached to the support members and the actuator plates, where the roller assemblies move relative to the support members to move the lift assembly between a raised position and a lowered position, and where a drive vehicle engages the transport assembly to move the support members of the lift assembly through through-holes of a plurality of support structures holding products configured as a consolidated unit, until the transport assembly engages a first support structure of the consolidated unit. The roller assemblies move in different directions to raise and lower the lift assembly carrying the consolidated unit.

22 Claims, 23 Drawing Sheets

(56) References Cited

U.S. PATENT DOCUMENTS

| | | | |
|---|---|---|---|
| 2016/0175847 A1 | 6/2016 | Arnell |
| 2016/0264385 A1 | 9/2016 | Burrow |
| 2017/0369292 A1 | 12/2017 | Ni et al. |
| 2018/0118541 A1 | 5/2018 | Hopkins et al. |
| 2022/0396440 A1 | 12/2022 | Aitto-Oja |

FOREIGN PATENT DOCUMENTS

| | | | | | |
|---|---|---|---|---|---|
| EP | 3771685 | A1 | | 2/2021 | |
| FR | 2890064 | A1 | * | 3/2007 | ............... B62B 3/06 |
| GB | 2507736 | A | * | 5/2014 | ........... B62B 3/0612 |
| RU | 180881 | U1 | | 6/2018 | |
| WO | WO-2011142662 | A1 | * | 11/2011 | .............. B66F 9/122 |
| WO | 2014072434 | A1 | | 5/2014 | |

* cited by examiner

AUTOMATED LOADING AND UNLOADING APPARATUS

BACKGROUND

The present application relates generally to an apparatus for loading materials in and unloading materials from containers, and more particularly, to an apparatus for simultaneously loading large quantities of products and unloading large quantities of products as a consolidated unit to and from containers, such as storage containers or shipping containers, or moving the consolidated unit to different locations in a processing plant, in significantly less time than conventional loading and unloading apparatuses to reduce processing and shipping costs.

Containers are used to store and transport different types of products. These containers are commonly attached to or supported by transport vehicles, such as trucks or railcars, and transported to a designated location. In conventional shipping systems, the products are placed on a support structure such as a pallet, and then moved by a forklift, lift truck or similar apparatus, which are configured to lift and move the pallet with the products to a designated location or into a container or out of a container. Typically, each pallet is moved separately into and out of the containers, which is time consuming, requires skilled operators and increases the likelihood of damage to the products.

Some loading and unloading systems can load products and materials into containers as a complete load. However, these systems do not interface with conventional pallets and either convey or slide products or materials into a container by pushing the products. It is difficult to move and align the products with the containers using this process and it's also very difficult to unload the products from containers.

Therefore, it is desirable to provide a loading and unloading apparatus for moving large quantities of products that is efficient while reducing processing and shipping time and costs.

SUMMARY

The present container loading and unloading apparatus is configured for moving a consolidated unit comprising several support structures, such as pallets, holding products, between locations at a processing or manufacturing facility or to and from containers, such as storage containers or shipping containers, dry vans or trucks and trailers. Simultaneously moving several pallets of products as a consolidated unit to and from containers or transporting the consolidated unit to different locations at a processing or manufacturing facility, reduces transport time and saves significant time and money.

In an embodiment, a loading and unloading apparatus is provided and includes a transport assembly and a lift assembly including a plurality of support members, where each of the support members is attached to the transport assembly and includes an actuator plate. A plurality of roller assemblies are movably attached to the support members and the actuator plates, where the roller assemblies move relative to the support members to move the lift assembly between a raised position and a lowered position, and where a drive vehicle engages the transport assembly to move the support members of the lift assembly through through-holes of a plurality of support structures holding products configured as a consolidated unit, until the transport assembly engages a first support structure of the consolidated unit. The roller assemblies move in different directions to raise and lower the lift assembly carrying the consolidated unit.

In another embodiment, a loading and unloading apparatus is provided and includes a transport assembly and a lift assembly including support members each having a plurality of interconnected intermediate members and a drive member connected to one of the intermediate members, each of the intermediate members includes a housing and an intermediate actuator plate that moves relative to the housing, and the drive member includes a drive actuator plate, where the intermediate actuator plates and the drive actuator plate are coupled together to form an actuator plate in each of the support members, a plurality of roller assemblies are movably attached to the support members, where the plurality of roller assemblies move the lift assembly between a raised position and a lowered position, where when the lift assembly is in the lowered position, a drive vehicle engages the transport assembly to move the support members of the lift assembly through through-holes of a plurality of support structures holding products configured as a consolidated unit, until the transport assembly engages a first support structure of the consolidated unit, and where the roller assemblies move the lift assembly to the raised position to raise the consolidated unit away from an underlying surface and enable the drive vehicle to move the consolidated unit to another location or into or out of a container, and the roller assemblies move the lift assembly to the lowered position to lower the consolidated unit to the underlying surface to enable the drive vehicle to move the lift assembly away from the consolidated unit and remove the consolidated unit from the lift assembly.

DETAILED DESCRIPTION

Figure 1:
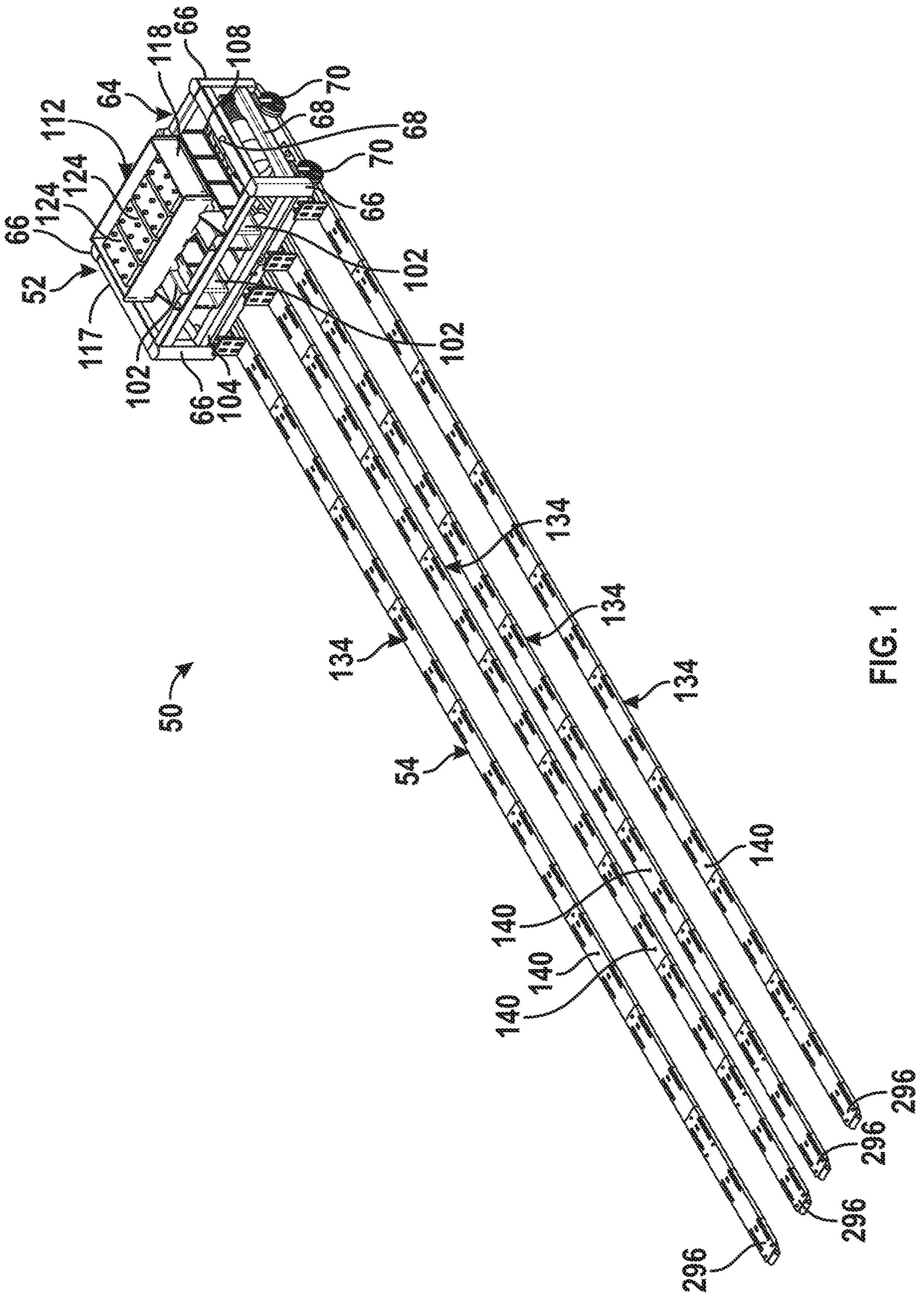
FIG. 1 is a perspective view of the present loading and unloading apparatus.
Figure 2A:
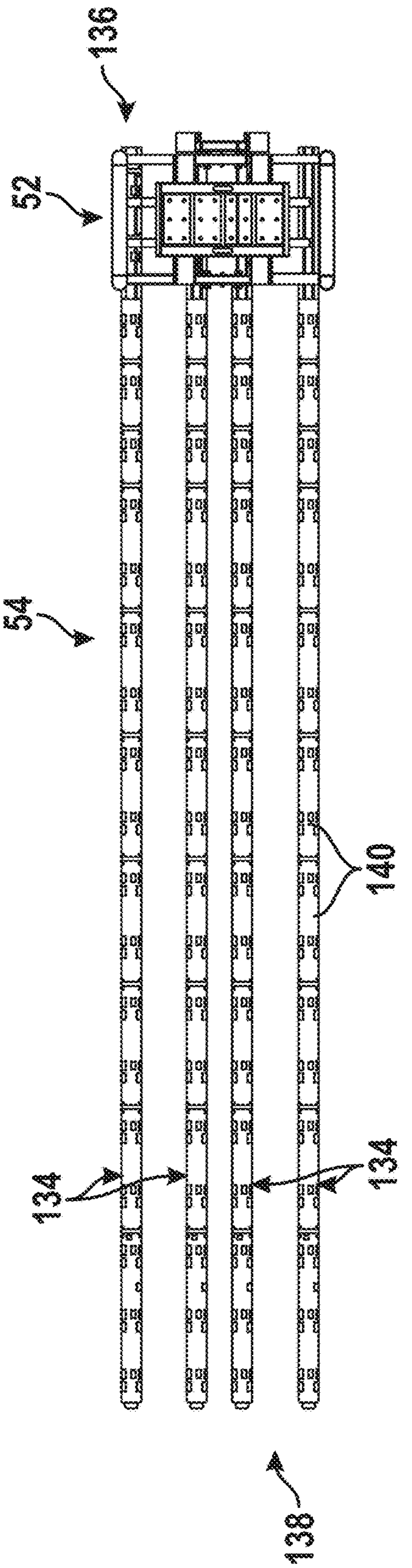
FIG. 2A is a top view of the loading and unloading apparatus of FIG. 1.
Figure 2B:
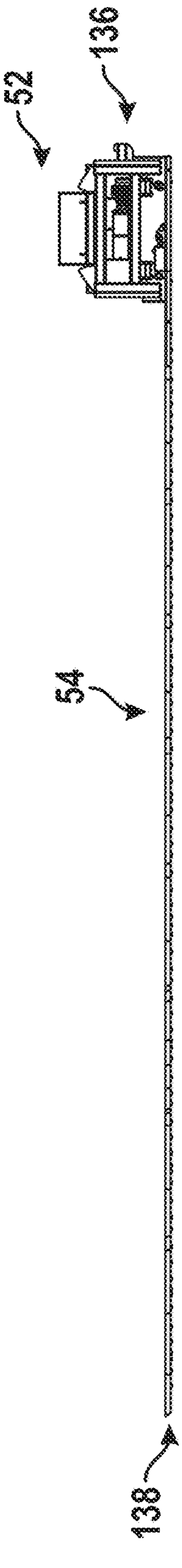
FIG. 2B is a side view of the loading and unloading apparatus of FIG. 1.
Figure 2C:
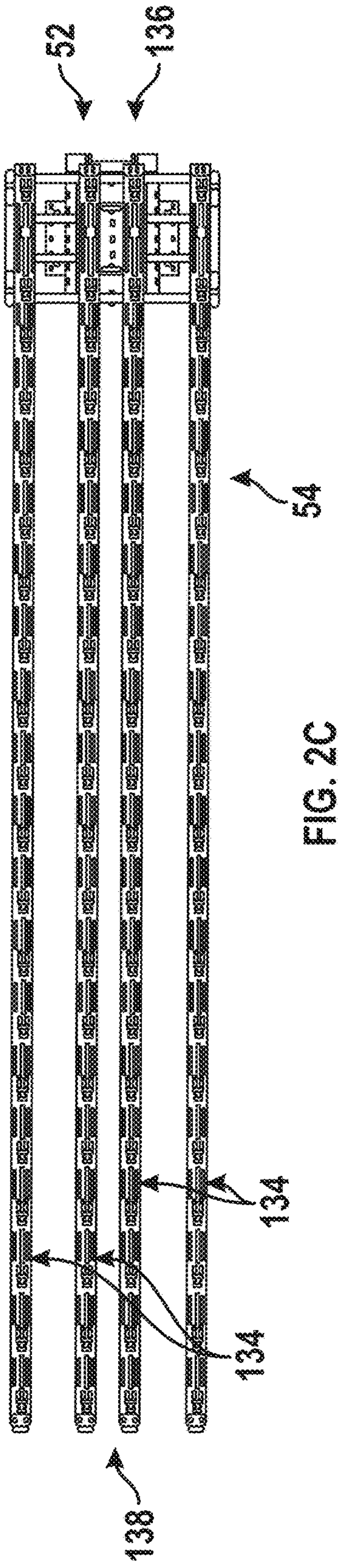
FIG. 2C is a bottom view of the loading and unloading apparatus of FIG. 1.
Figure 2D:
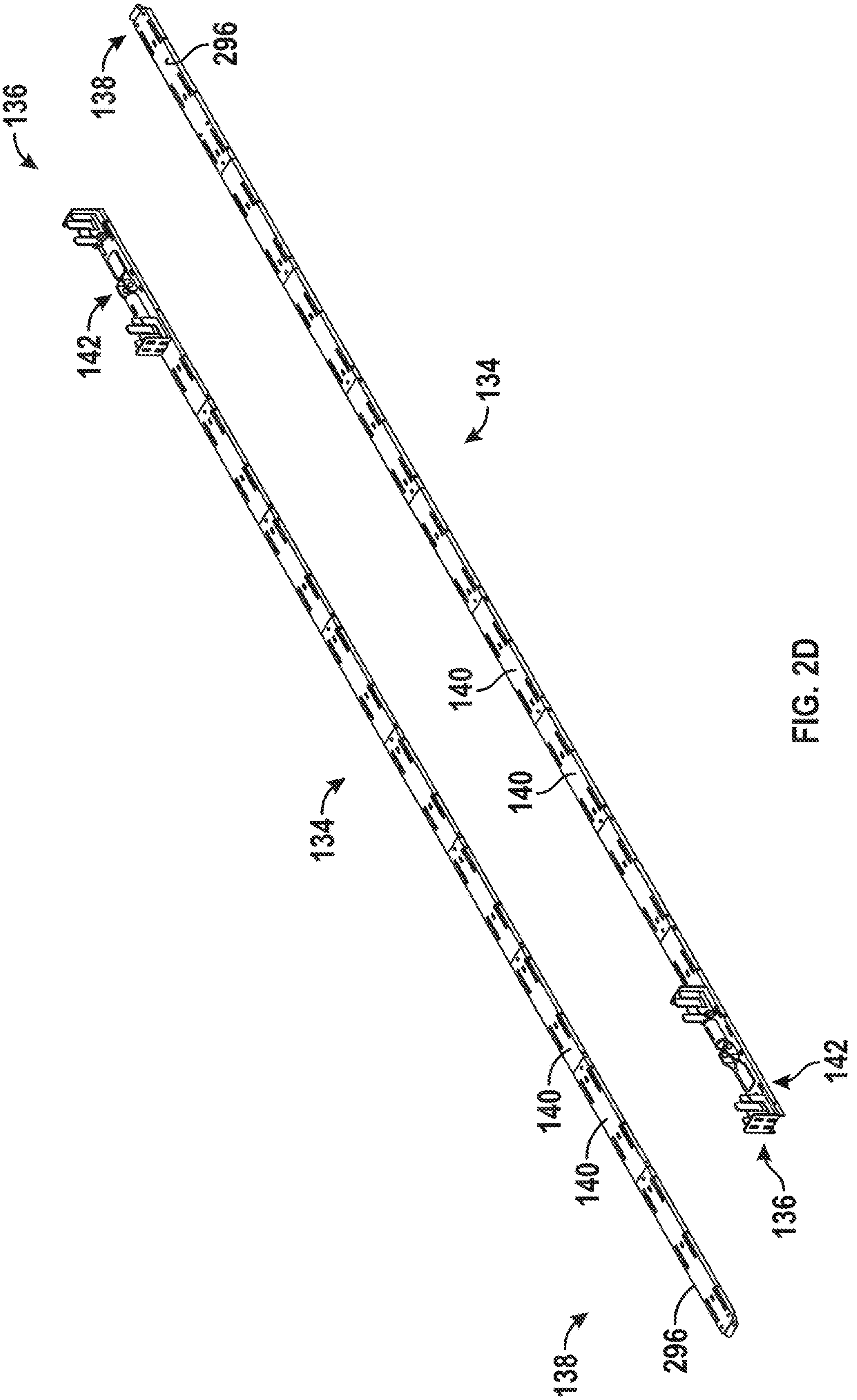
FIG. 2D is a perspective view of two of the support members of the loading and unloading apparatus of FIG. 1.
Figure 3A:
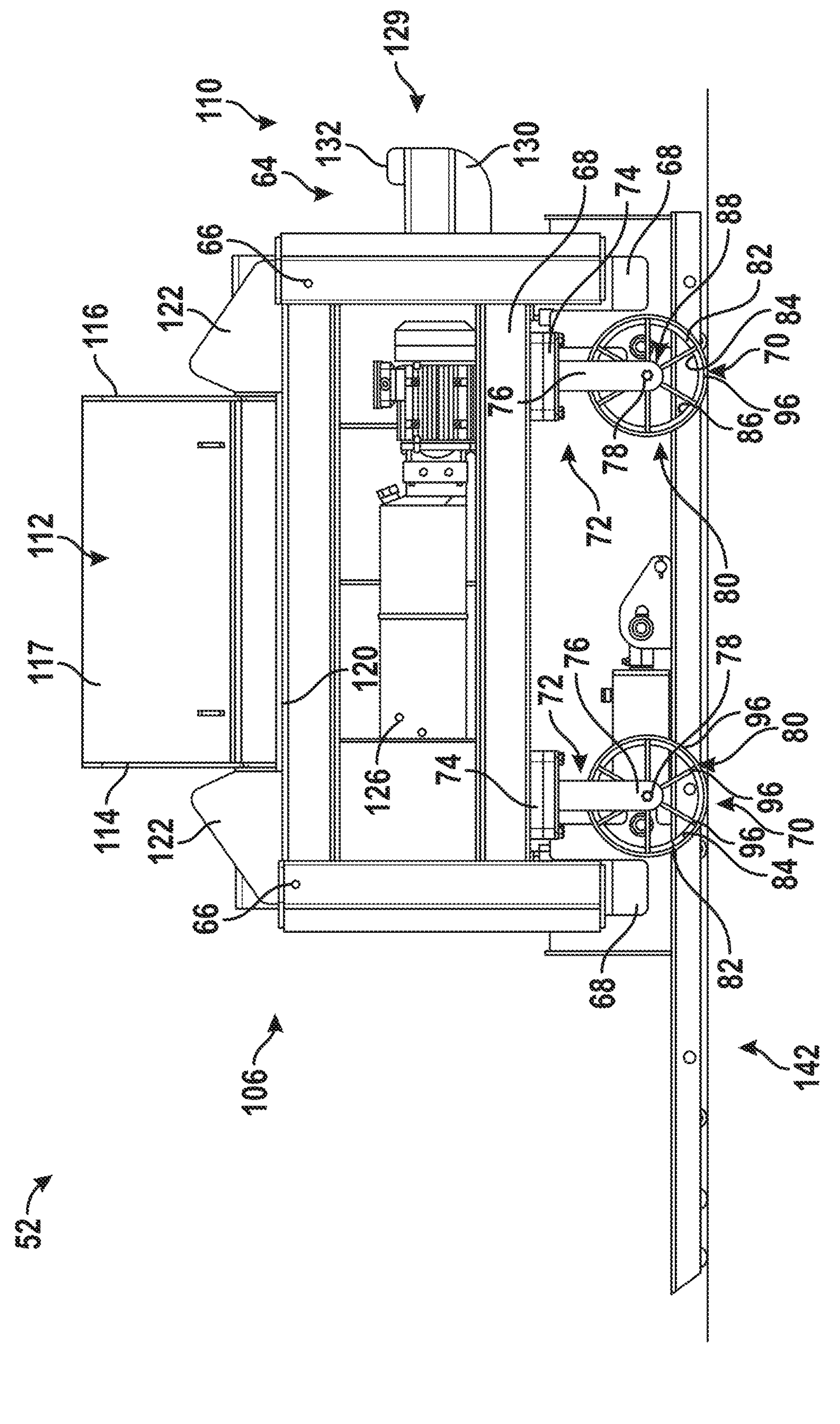
FIG. 3A is a fragmentary side view of the loading and unloading apparatus of FIG. 1.
Figure 3B:
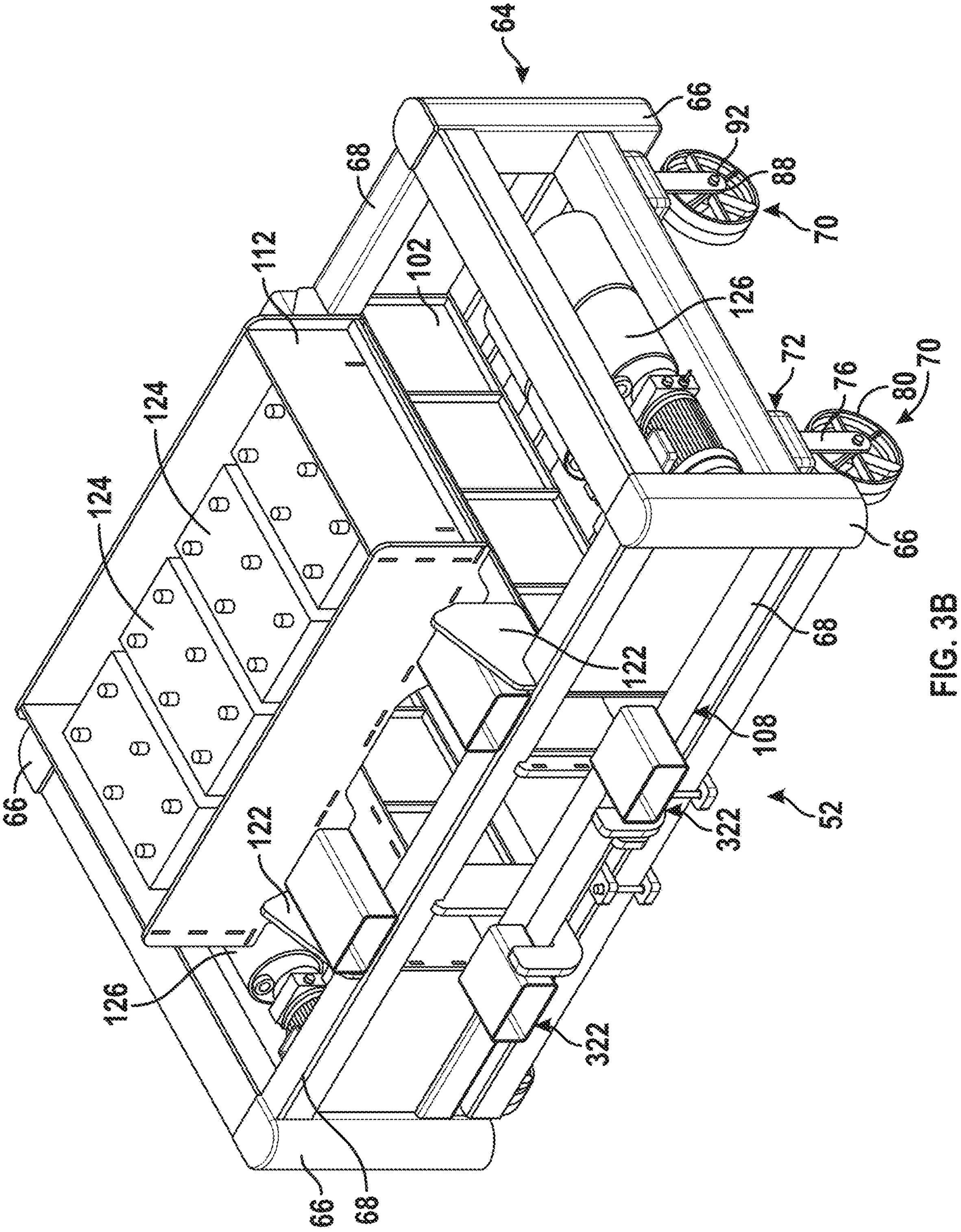
FIG. 3B is a rear perspective view of the transport assembly of the loading and unloading apparatus of FIG. 1.
Figure 3C:
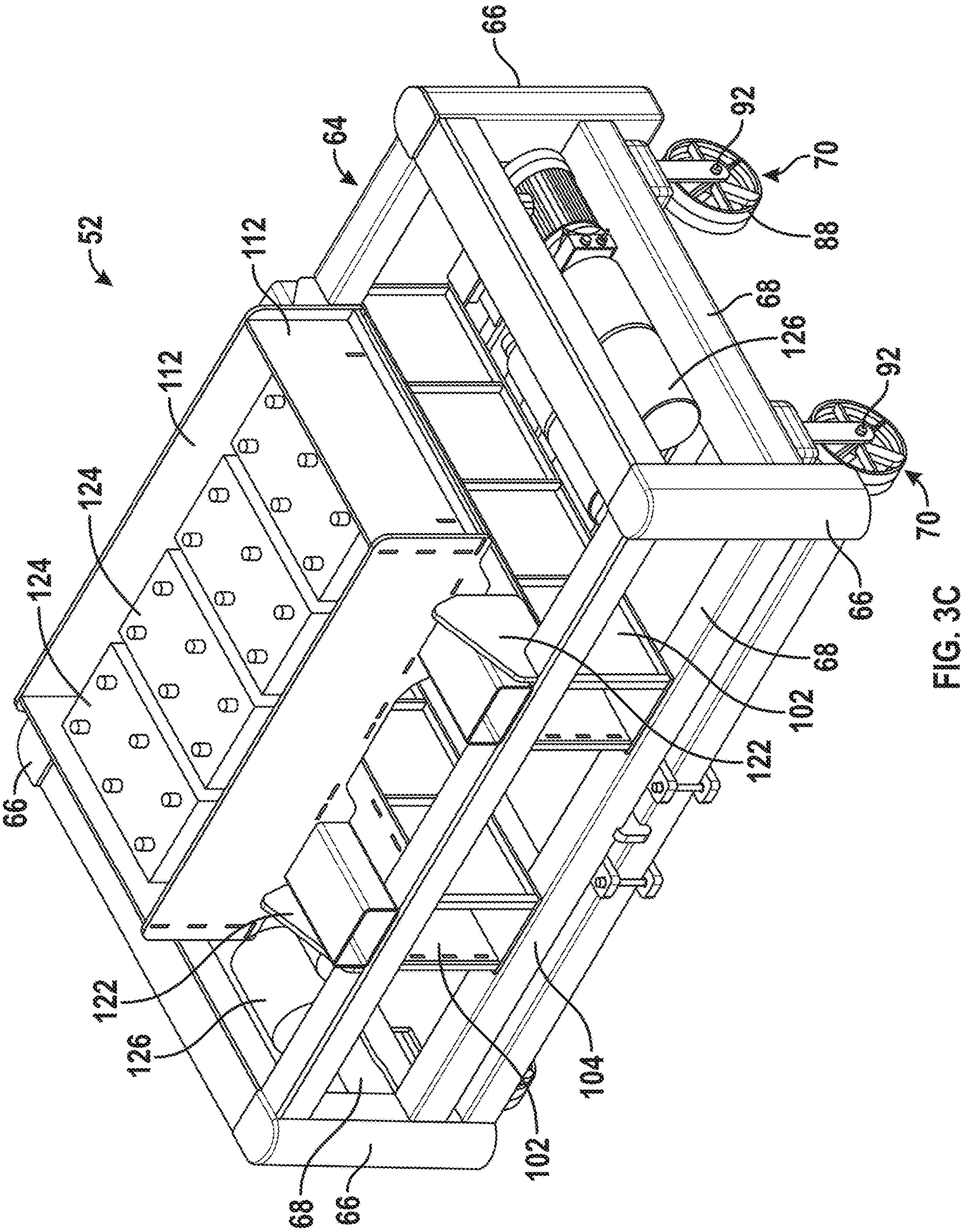
FIG. 3C is a front perspective view of the transport assembly of the loading and unloading apparatus of FIG. 1.
Figure 3D:
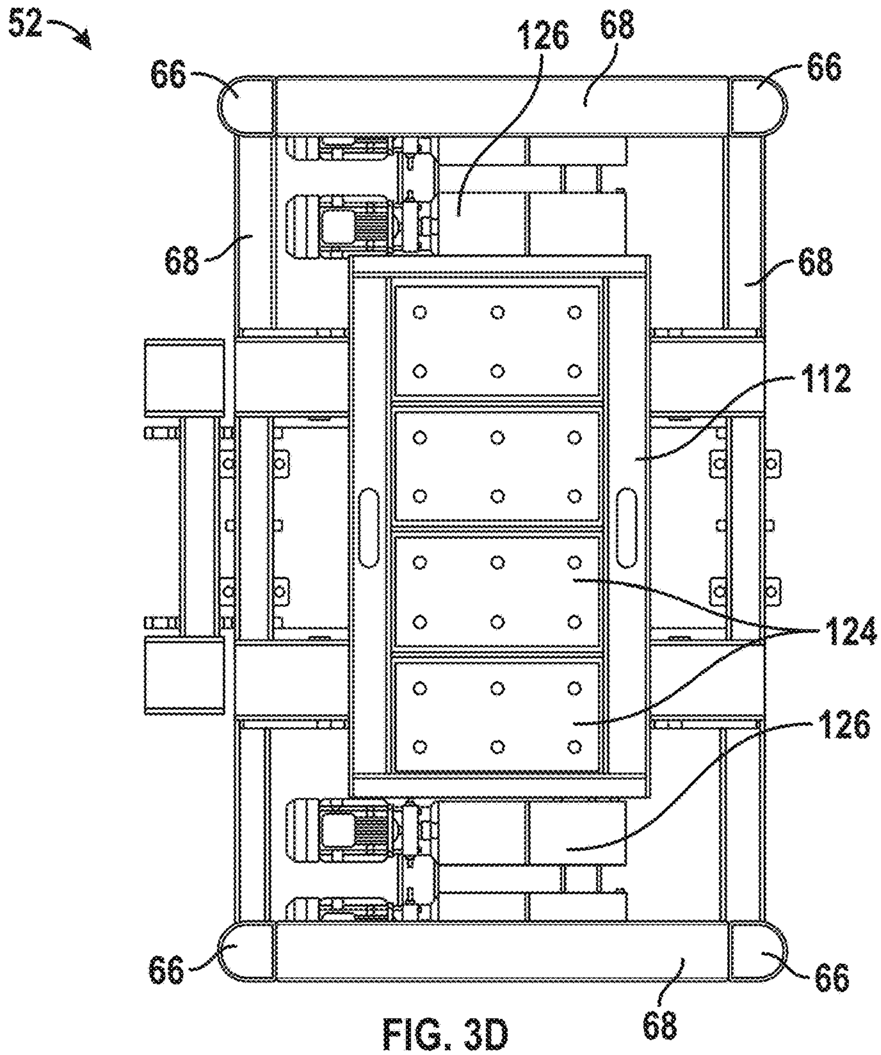
FIG. 3D is a top view of the transport assembly of the loading and unloading apparatus of FIG. 1.
Figure 3E:
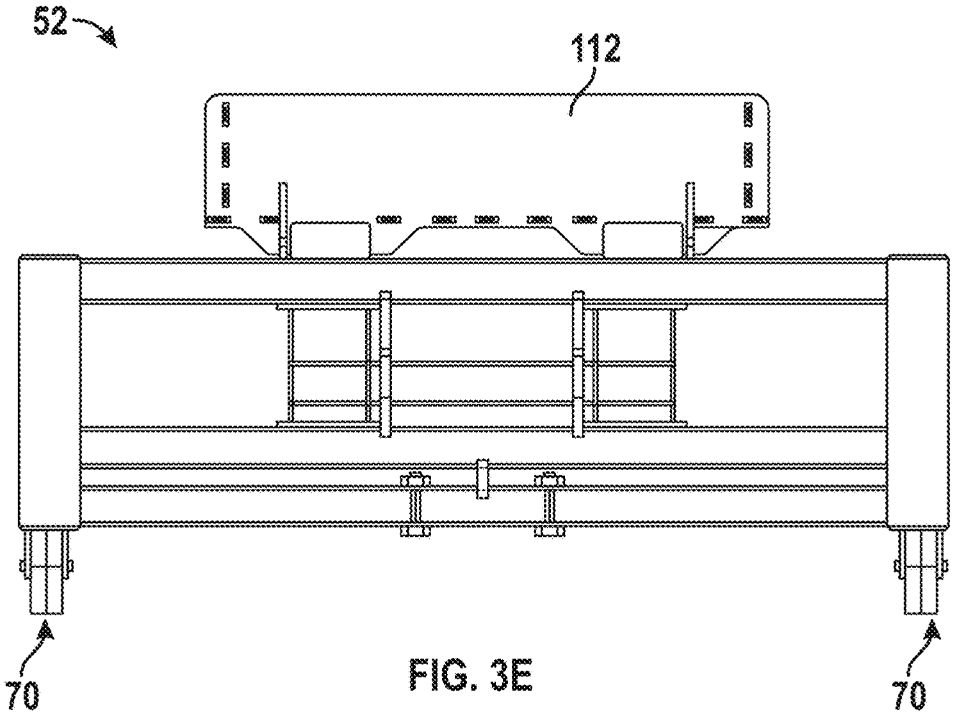
FIG. 3E is a front view of the transport assembly of the loading and unloading apparatus of FIG. 1.
Figure 3F:
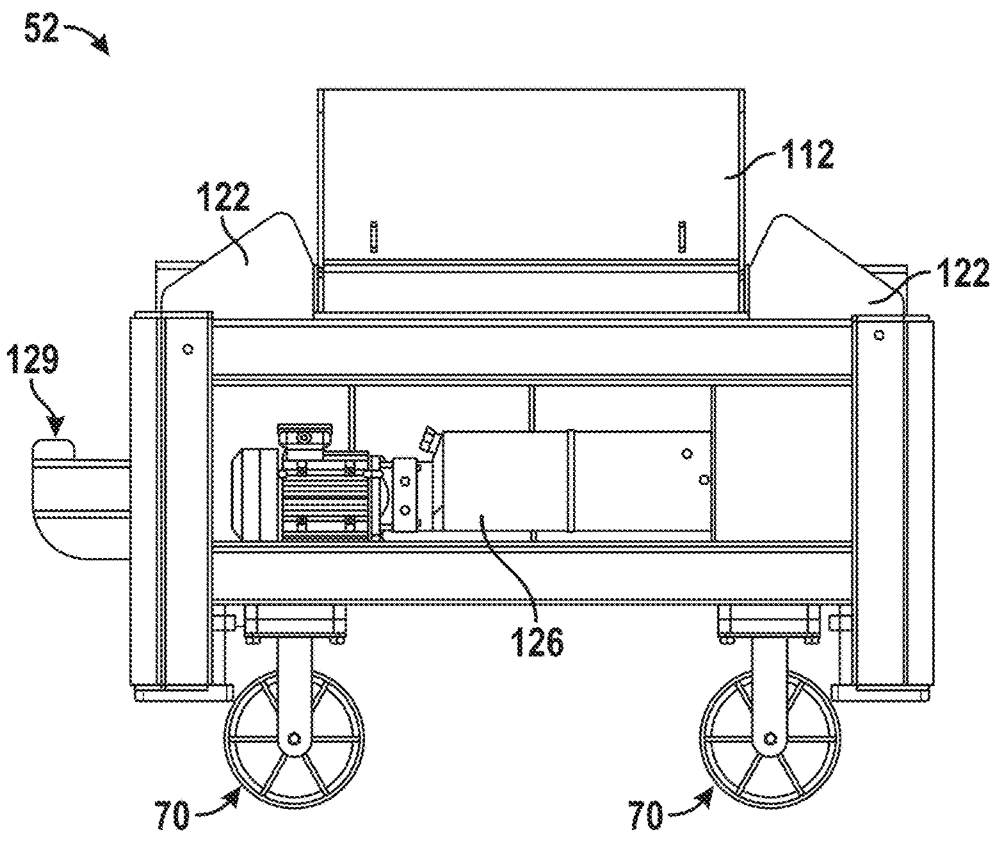
FIG. 3F is a right side view of the transport assembly of the loading and unloading apparatus of FIG. 1, where the left side view is a mirror image of this view.
Figure 3G:
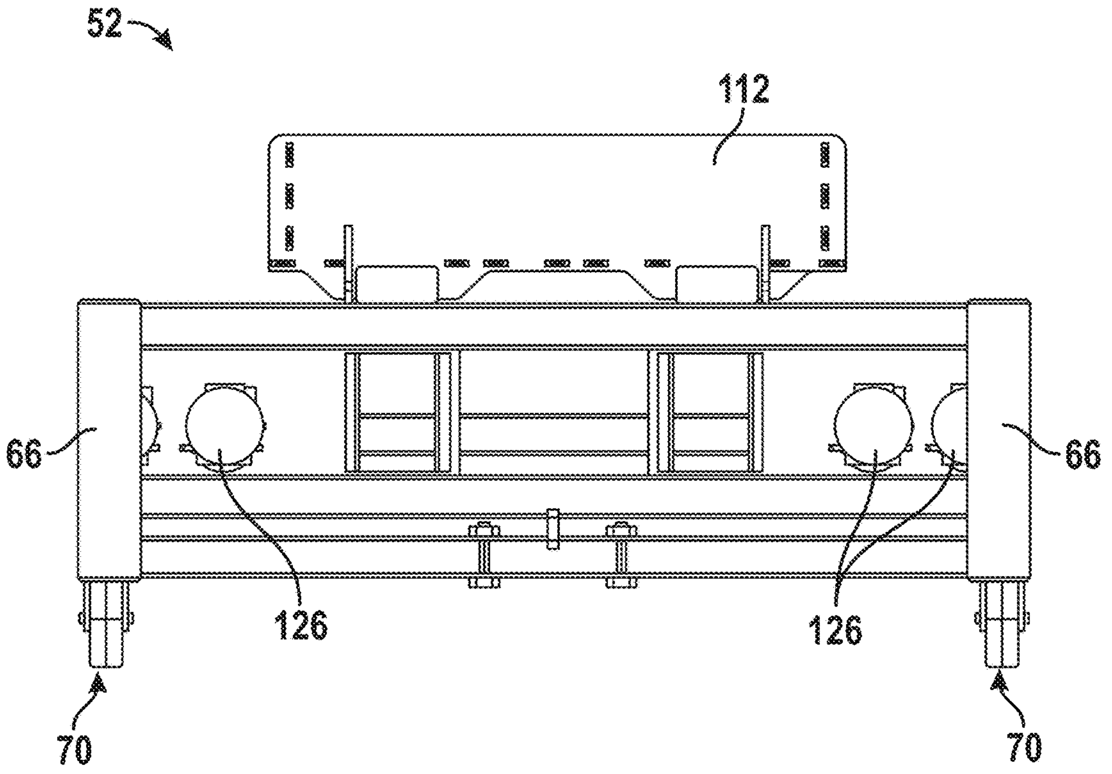
FIG. 3G is a rear view of the transport assembly of the loading and unloading apparatus of FIG. 1.

The present container loading and unloading apparatus is configured for loading and unloading large quantities of products on several support structures, such as pallets, as a consolidated unit to and from containers, such as storage containers or shipping containers, dry vans or trucks and trailers or between locations at a processing facility or manufacturing facility. Simultaneously moving several pallets of products as a consolidated unit to and from containers or transporting the consolidated unit to different locations at a processing or manufacturing facility, saves significant time and money.

Referring now to FIGS. 1-11, the present container loading and unloading apparatus 50 includes a transport assembly 52 connected to a lift assembly 54 where the lift assembly 54 engages multiple support structures, such as pallets 56, each holding products 58, as a consolidated unit 60 and moves the consolidated unit. A vehicle, such as a forklift 62, engages the transport assembly 52, which is connected to the lift assembly 54, and moves the consolidated unit 60, between locations or into and out of a container associated with a van, a truck, a trailer or similar transport vehicle.

The transport assembly 52 includes a main frame 64 formed by interconnected vertical support members 66 and horizontal support members 68 that are connected together by welding, rivets or by suitable fasteners. Two wheel assemblies 70 are connected to opposing sides of the main frame 64 and are configured to enable the transport assembly 52 to move along an underlying surface, such as the floor of a processing plant, the floor of a container or the ground. As shown, the wheel assemblies 70 include a wheel bracket 72 that each have a base mount 74 and opposing legs 76 extending from the base mount 74. The legs 76 extending from each base mount 74 are spaced from each other and have a through-hole 78, where the through-holes of the legs 76 are aligned with each other. A wheel 80 is connected to the legs 76, where each wheel includes a rim 82 with a rim base 84 and a plurality of spokes 86. Specifically, the spokes 86 extend between the rim base 84 and a hub 88 and provide support for the wheels. The hub 88 includes a through-hole that is aligned with the through-holes 78 of the legs 76, where a fastener is inserted through the through-holes 78 and secured in position by a washer and nut 92. A tire 96, made of rubber or other suitable material or combination of materials, is mounted to the outer surface of the rim 82 and provides traction on an underlying surface.

In an embodiment, the tire 96 includes a plurality of tread members (not shown) that extend from the surface of the tire and help the tire grip the underlying surface. The tire 96 also has an air valve (not shown) that enables the tire to receive air to fill the interior of the tire to a predetermined air pressure. In another embodiment, the tire 96 is made with a durable material that does not require air, and provides sufficient traction with the underlying surface.

In the illustrated embodiment, two wheel assemblies 70 are mounted on opposing sides of the main frame 64. In another embodiment, two or more of the wheel assemblies 70 are mounted to the opposing sides of the main frame 64 and between the opposing sides of the main frame 64. For example, four of the wheel assemblies 70 may be mounted to the main frame 64 between opposing sides of the main frame such that there are eight wheel assemblies mounted to the main frame. It should be appreciated that any suitable number of the wheel assemblies 70 may be mounted to the main frame 64 to help the transport assembly 52 move along an underlying surface.

Referring to FIGS. 1 to 4, two battery mounting members 102 are mounted to the main frame 64 between the opposing sides of the main frame. The battery mounting members 102 are rectangular mounting members that include four walls that are welded together or connected together by rivets or fasteners. In the illustrated embodiment, the battery mounting members 102 are positioned on and mounted to the front frame member 104 at a first end 106 and a rear frame member 108 at a second end 110. A battery housing 112 formed by a front wall 114, a rear wall 116, opposing sidewalls 117 and 118, and a bottom wall 120 that are connected together by welding or fasteners. The battery housing 112 is guided into position by frame guides 122 on the battery mounting members 102 and seated on an upper surface of the battery mounting members. As shown in FIG. 1, a plurality of battery packs 124 are positioned in the battery housing 112. It should be appreciated that there may be one battery pack 124 or a plurality of battery packs 124 in the battery housing 112. The battery packs 124 are electrically connected to each other and provide power to the hydraulic power units 126.

Figure 13:
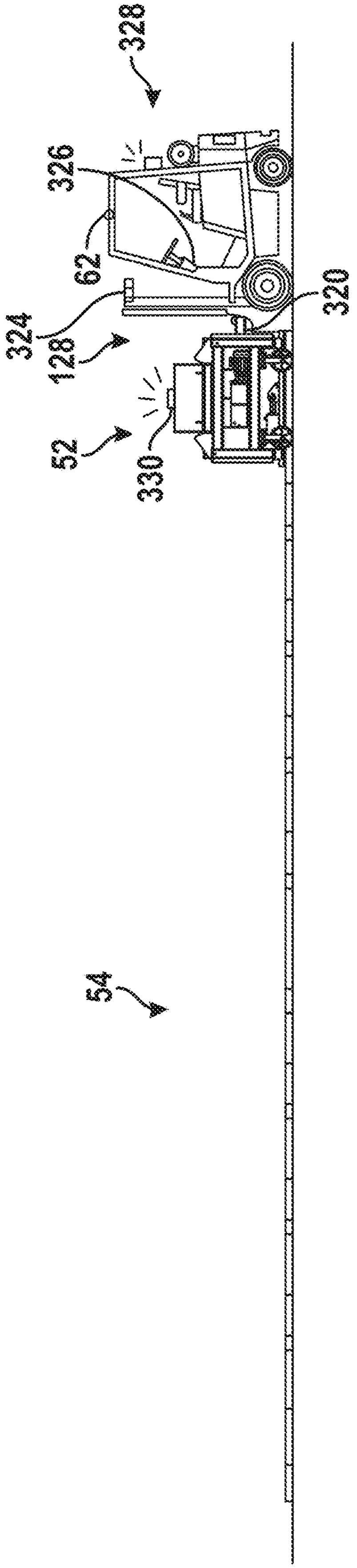
FIG. 13 is a side view of the loading and unloading apparatus of FIG. 1 showing a forklift engaged with the loading and unloading apparatus.
Figure 14:
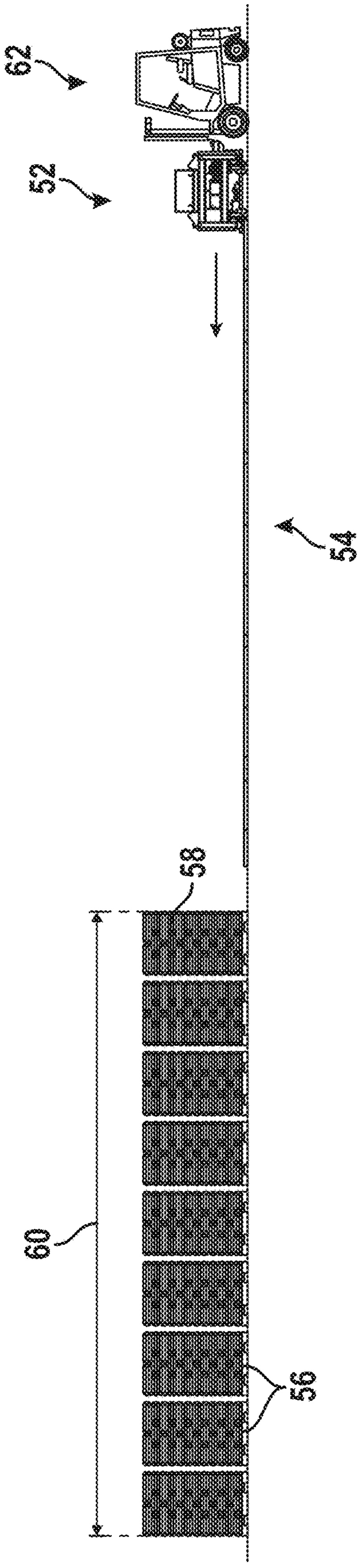
FIG. 14 is a side view of the loading and unloading apparatus of FIG. 13 being moved by the forklift toward a consolidated unit including several pallets holding products.
Figure 15:
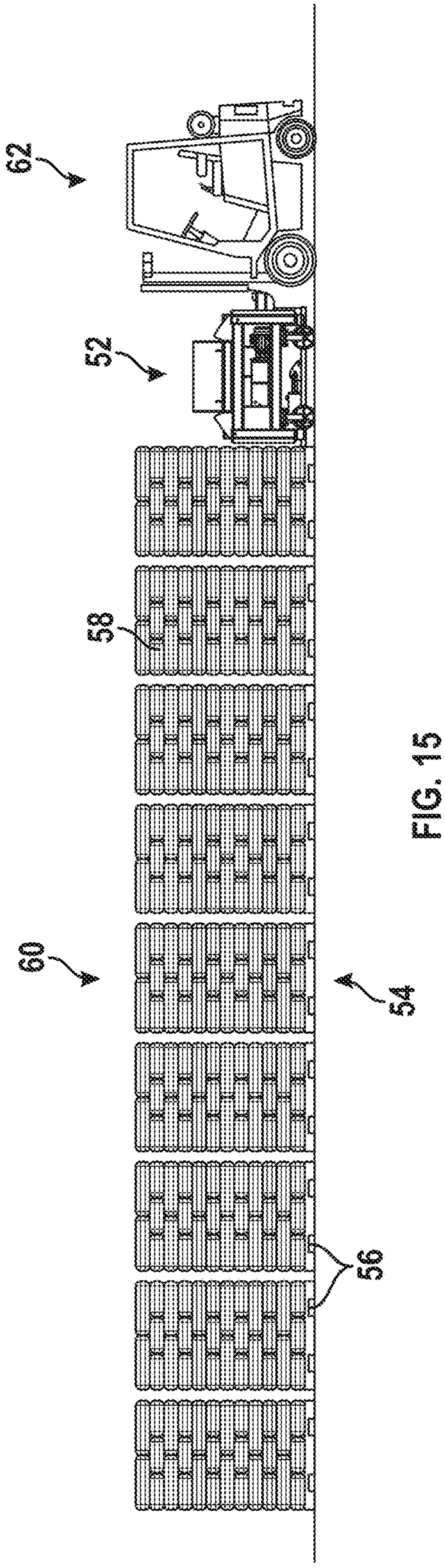
FIG. 15 is a side view of the loading and unloading apparatus of FIG. 13 showing the forklift fully engaged with the consolidated unit including several pallets holding products.
Figure 16:
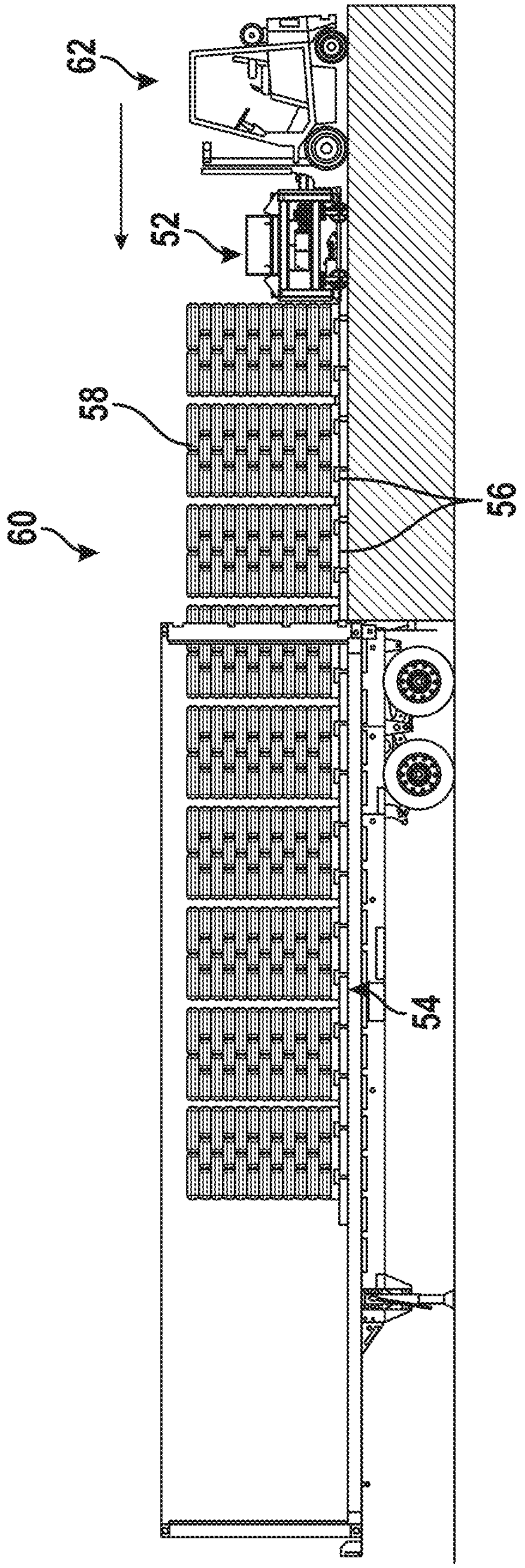
FIG. 16 is a side view of the loading and unloading apparatus of FIG. 13 where the forklift has lifted the loading and unloading apparatus to move the pallets into a container.
Figure 17:
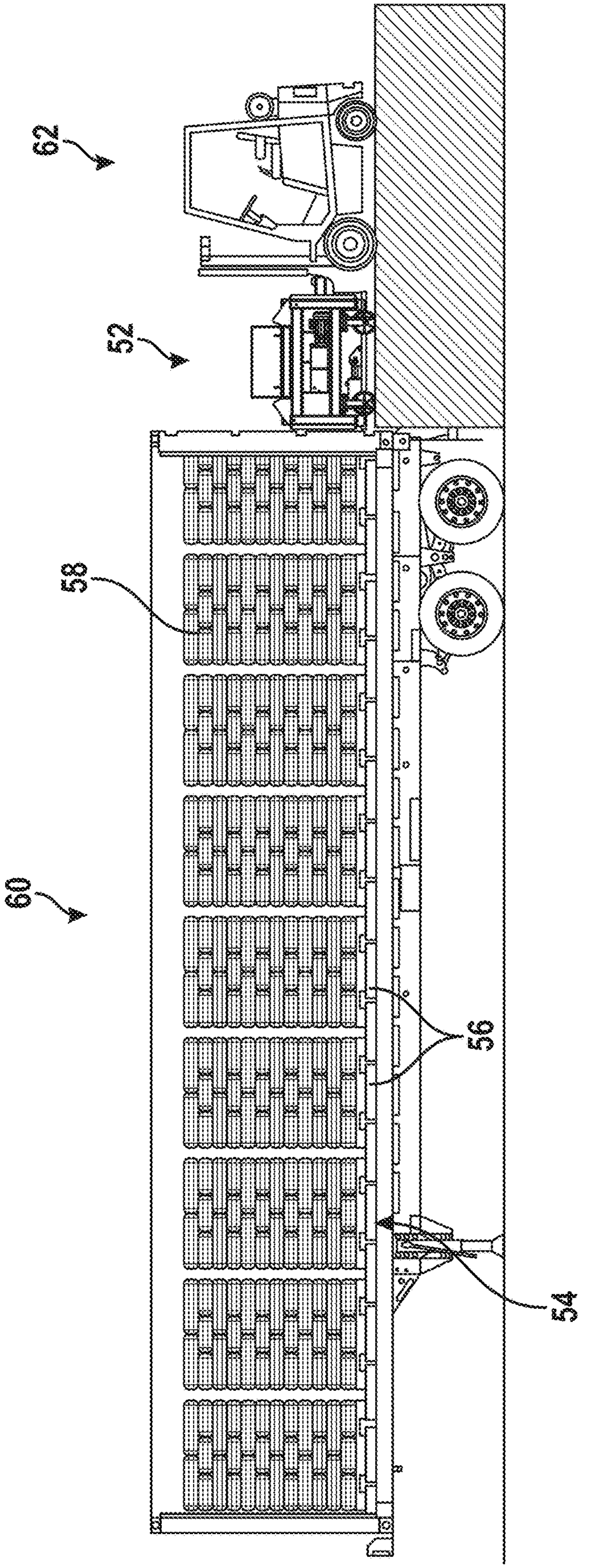
FIG. 17 is a side view of the loading and unloading apparatus where the forklift has lowered the loading and unloading apparatus to lower the consolidated unit to the lowered position.
Figure 18:
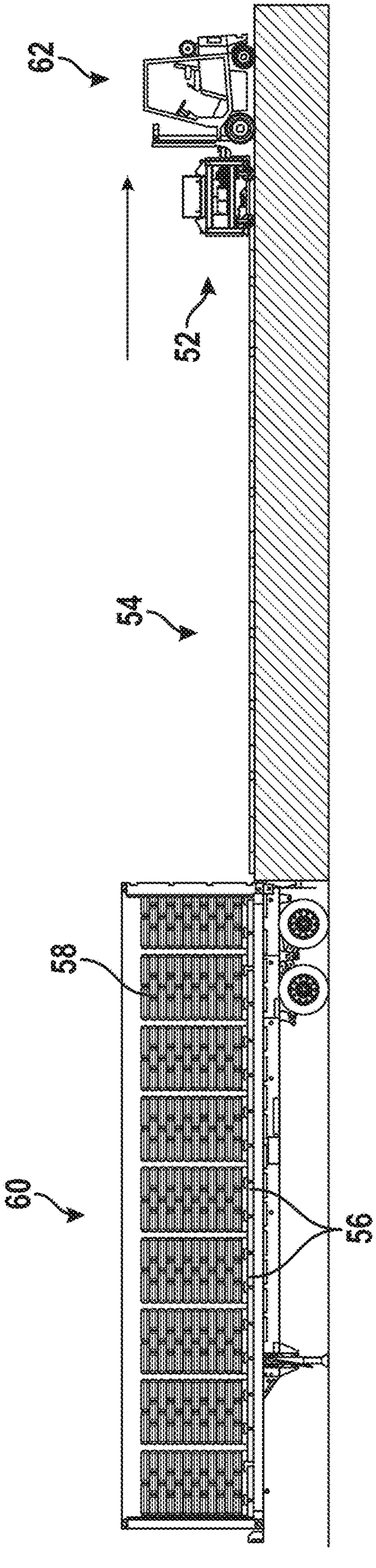
FIG. 18 is a side view of the loading and unloading apparatus where the forklift has removed the loading and unloading apparatus from the consolidated unit.

In an embodiment, the main frame 64 includes a transport connector 129 that extends from the main frame. The transport connector 129 includes a base 130 and a stop member 132 extending transversely from the base, where the stop member 132 engages a portion of the frame of a vehicle, such as the forklift 62, so that the transport assembly 52 remains connected to the forklift 62 during loading and unloading processes. The transport assembly 52 may be disconnected from the forklift 62 by raising the forklift lifting mechanism 134 (FIG. 13) and then moving the forklift 62 away from the transport assembly 52.

The lift assembly 54 includes a plurality of forks or support members 134, where each of the support members 134 includes a first end or rear end 136 and an opposing second end or front end 138. In the illustrated embodiment, each support member 134 includes a plurality of interconnected intermediate members 140. The number of intermediate members 140 that are connected together to form the support members 134 depends on the number of support structures (pallets 56) being moved by the unloading and loading apparatus 50, i.e., the overall length of the consolidated unit 60 including the pallets 56.

Figure 4:
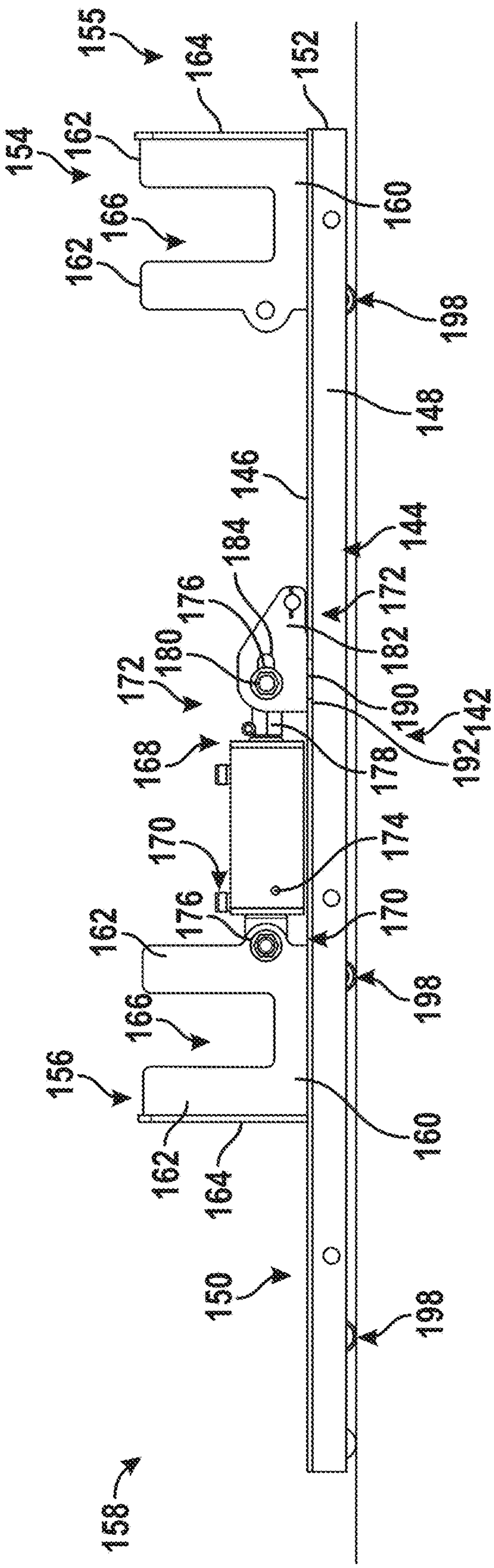
FIG. 4 is a side view of the drive member of the lift assembly shown in FIG. 1.
Figure 5:
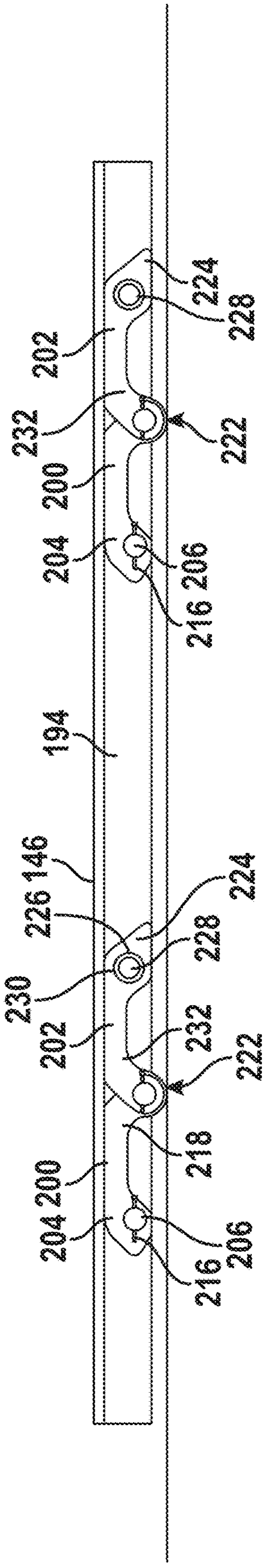
FIG. 5 is a side view of the lift assembly showing the lift assembly of FIG. 1 in the lowered position.
Figure 6:
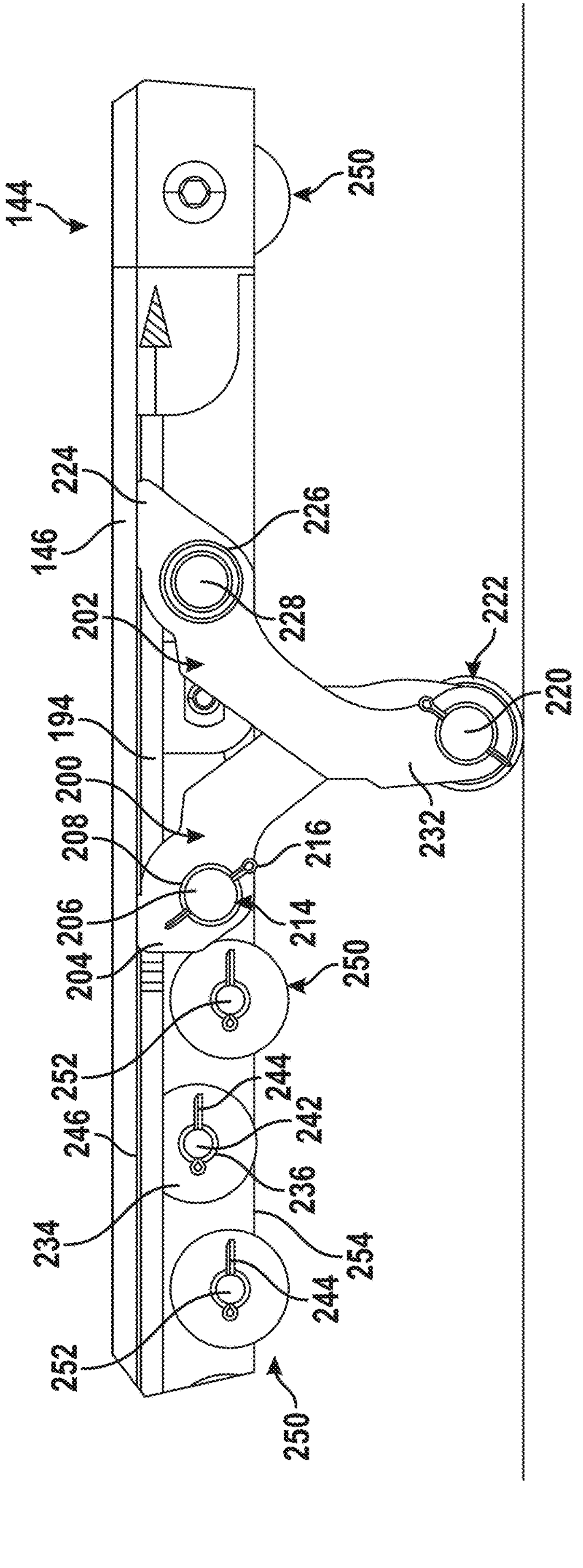
FIG. 6 a fragmentary side view of the lift assembly showing the lift assembly in the raised position.
Figure 7A:
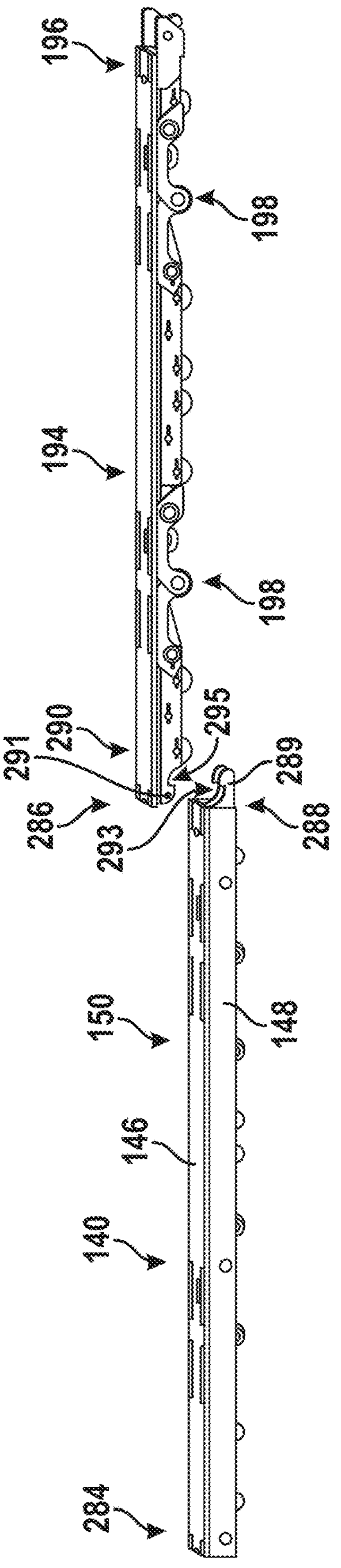
FIG. 7A is a side view of an intermediate member showing the housing and the actuator plate.
Figure 7B:
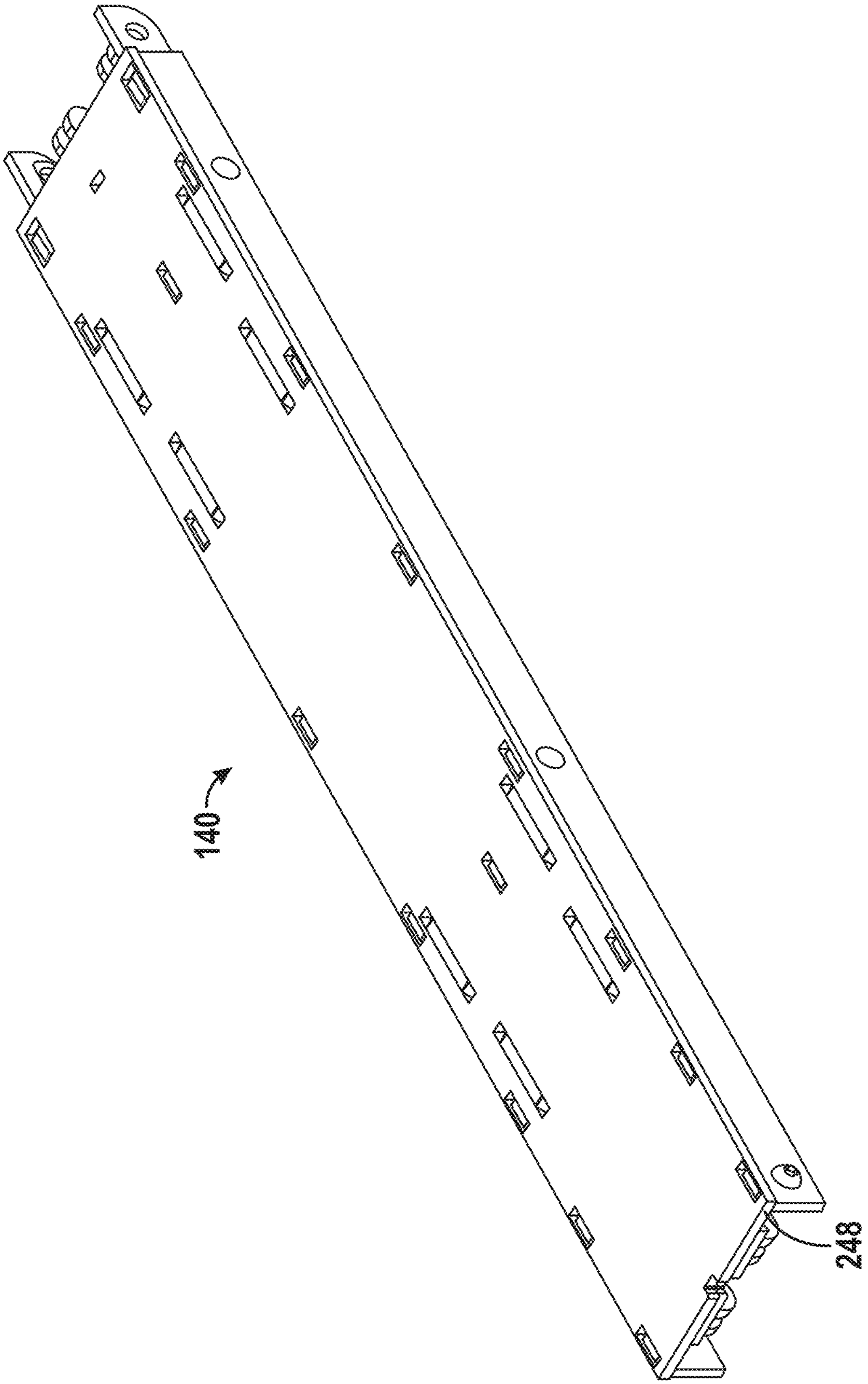
FIG. 7B is a perspective view of the intermediate member of FIG. 7A.
Figure 7C:
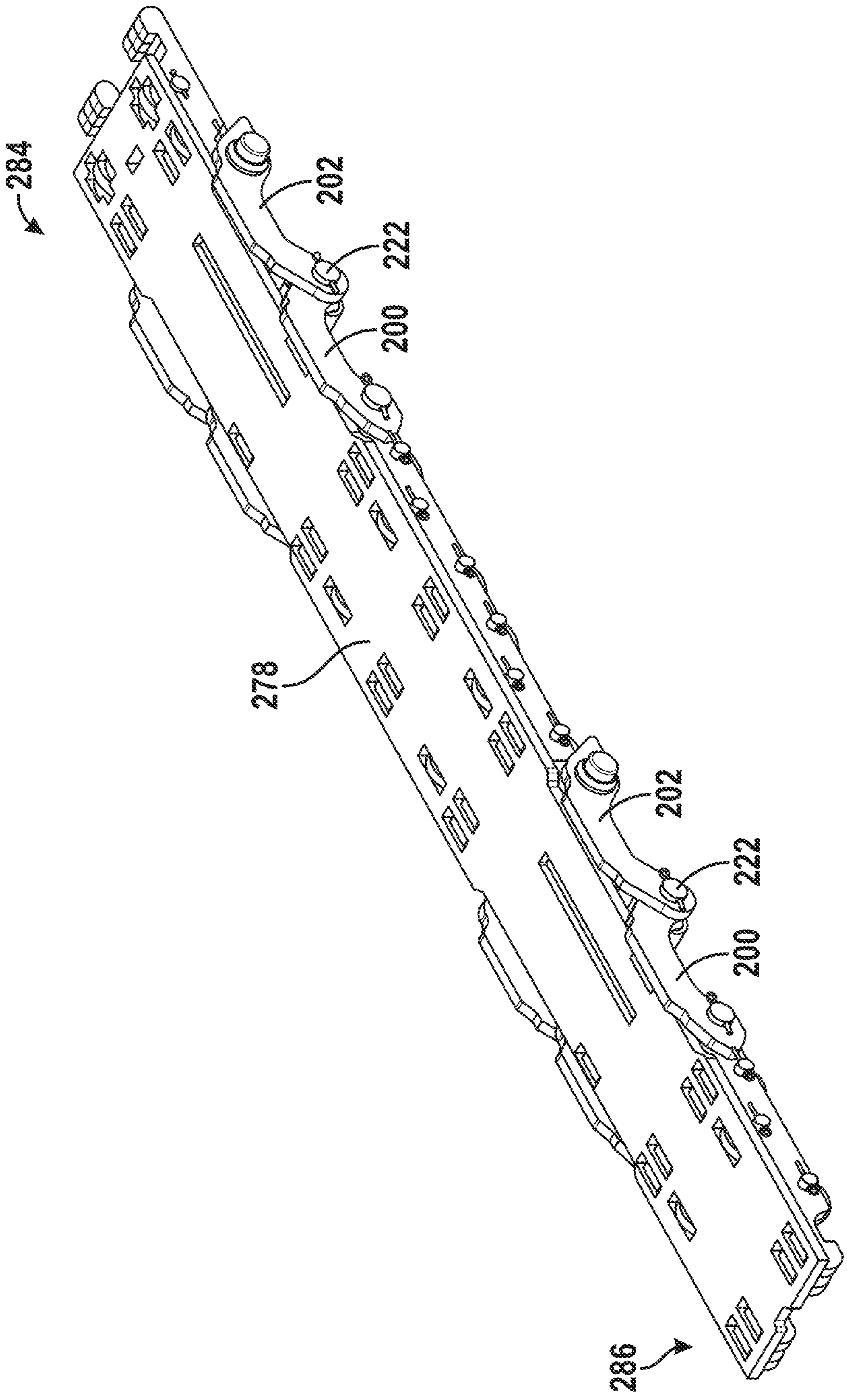
FIG. 7C is a perspective view of an intermediate actuator plate of the intermediate member of FIG. 7A.
Figure 7D:
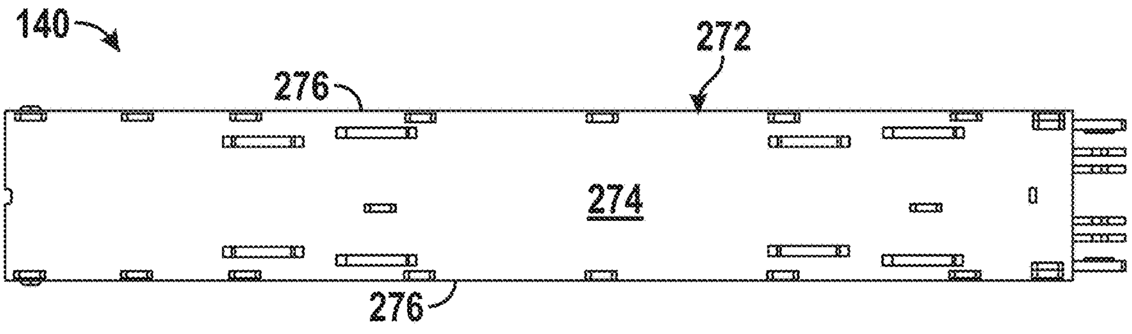
FIG. 7D is a top view of the intermediate member of FIG. 7A.
Figure 7E:
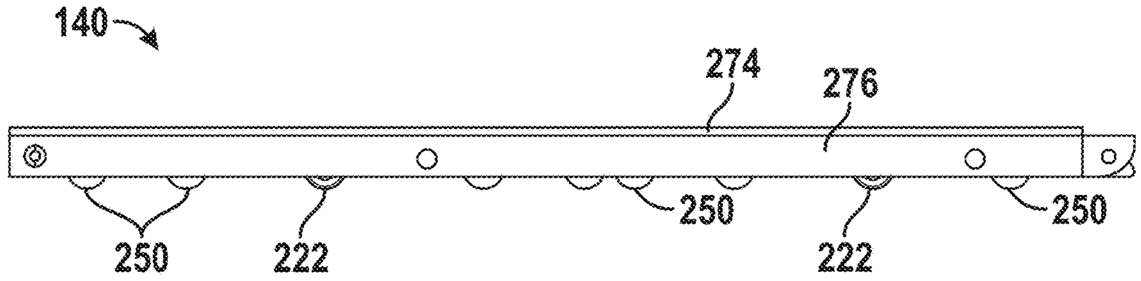
FIG. 7E is a side view of the intermediate member of FIG. 7A.
Figure 7F:
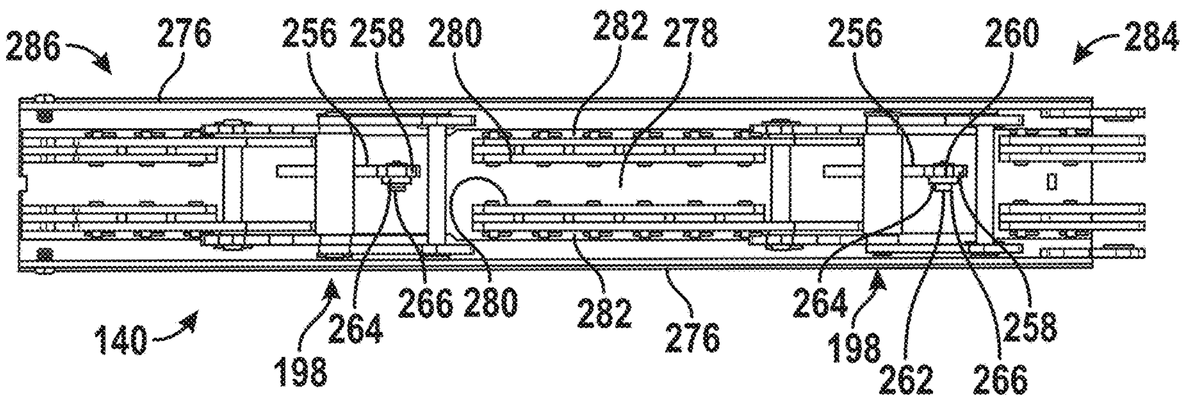
FIG. 7F is a bottom view of the intermediate member of FIG. 7A.
Figure 7G:
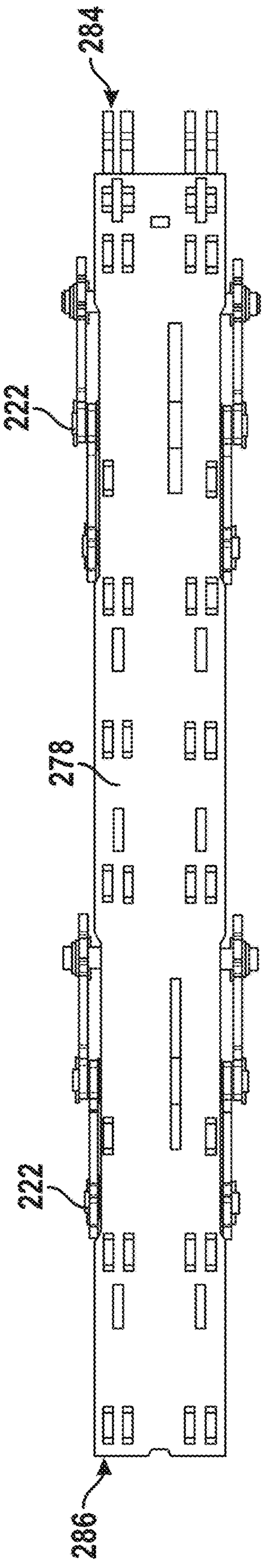
FIG. 7G is a top view of the intermediate actuator plate of FIG. 7C.
Figure 7H:
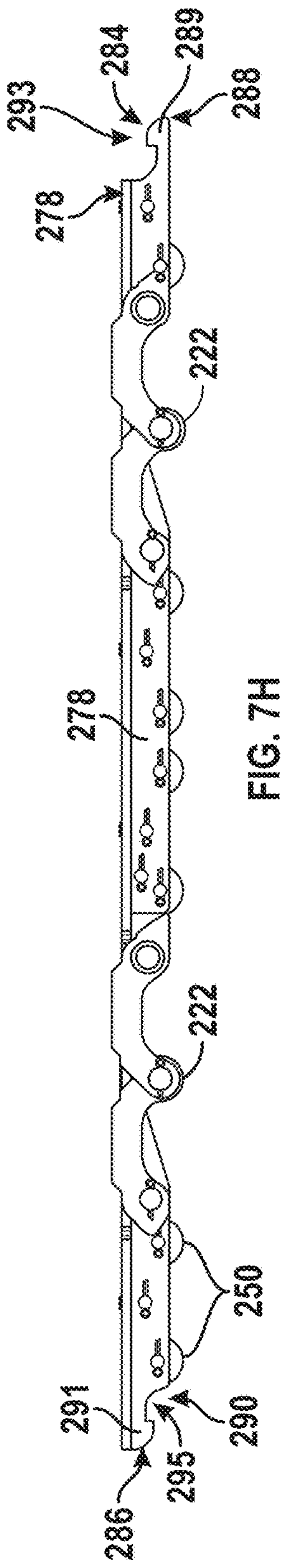
FIG. 7H is a side view of the intermediate actuator plate of FIG. 7C.
Figure 7I:
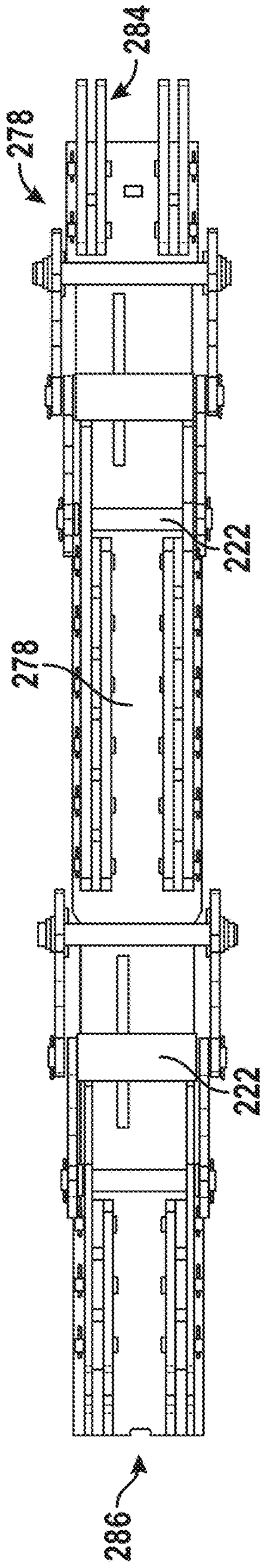
FIG. 7I is a bottom view of the intermediate actuator plate of FIG. 7C.

Referring to FIGS. 1 to 4, at the rear ends 136 of each of the support members 134 is a drive member 142, which enables the support members 134 to be raised, lowered and moved by the transport assembly 52. In the illustrated embodiment, the drive member 142 includes a housing 144 having a top wall 146, opposing sidewalls 148 and 150, and an end wall 152. A pair of first support brackets 154 are mounted at the rear end 155 of the housing 144 and a pair of second support brackets 156 are mounted between the front end 158 and the rear end 155 of the housing 144. As shown in FIG. 4, the first support brackets 154 and the second support brackets 156 are laterally spaced from each other, and preferably are adjacent to each of the sidewalls 148, 150 of the housing 144. It should be appreciated that the drive member 142 may have any suitable number of support brackets that are positioned at any location on the housing 144. In this embodiment, each of the first and second support brackets 154, 156 includes a base wall 160 and opposing, vertically extending walls 162 that are integrally formed together and have a u-shape.

Figure 10:
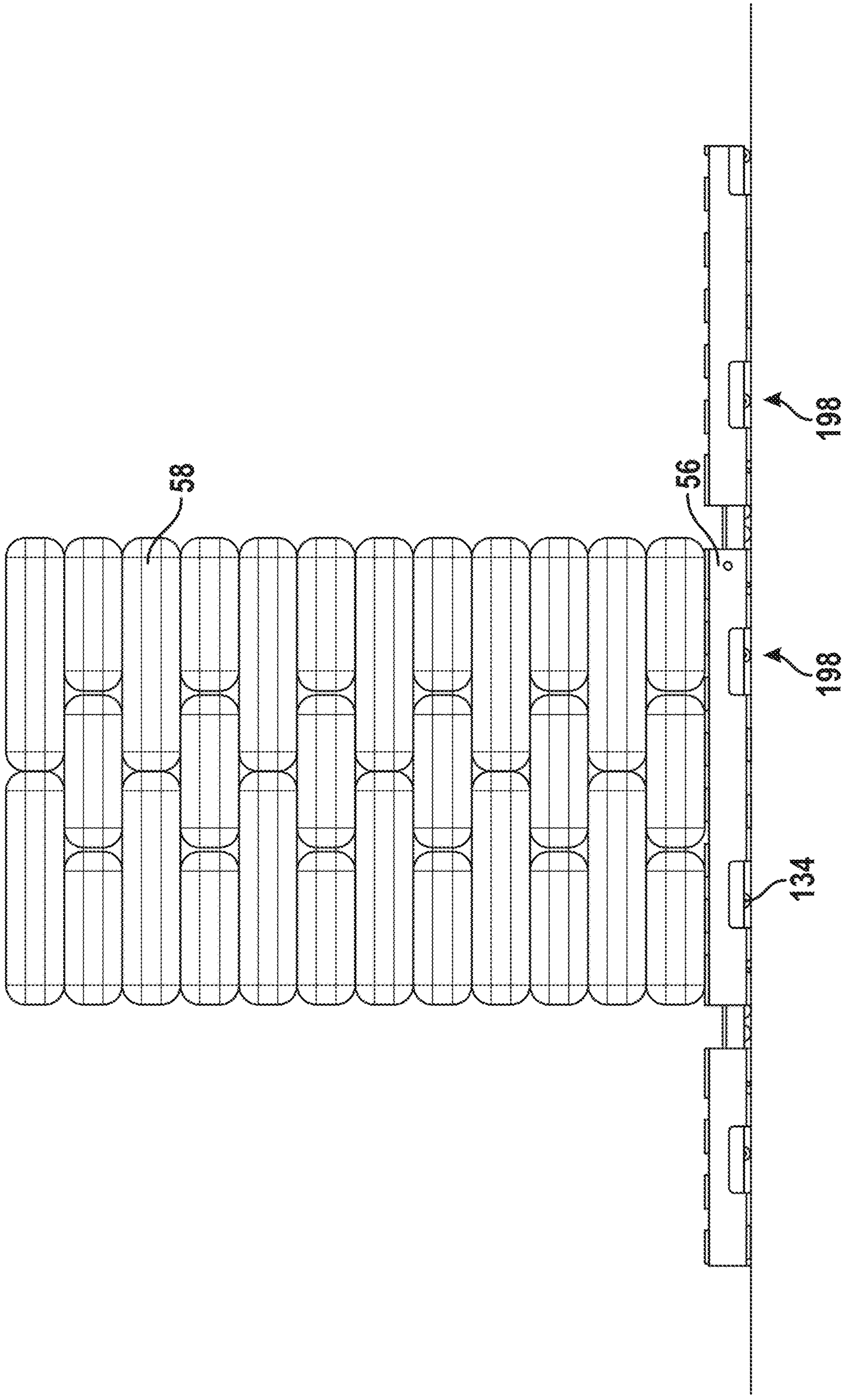
FIG. 10 is a side view of the lift assembly engaged with a pallet where the lift assembly is in the lowered position.
Figure 11:
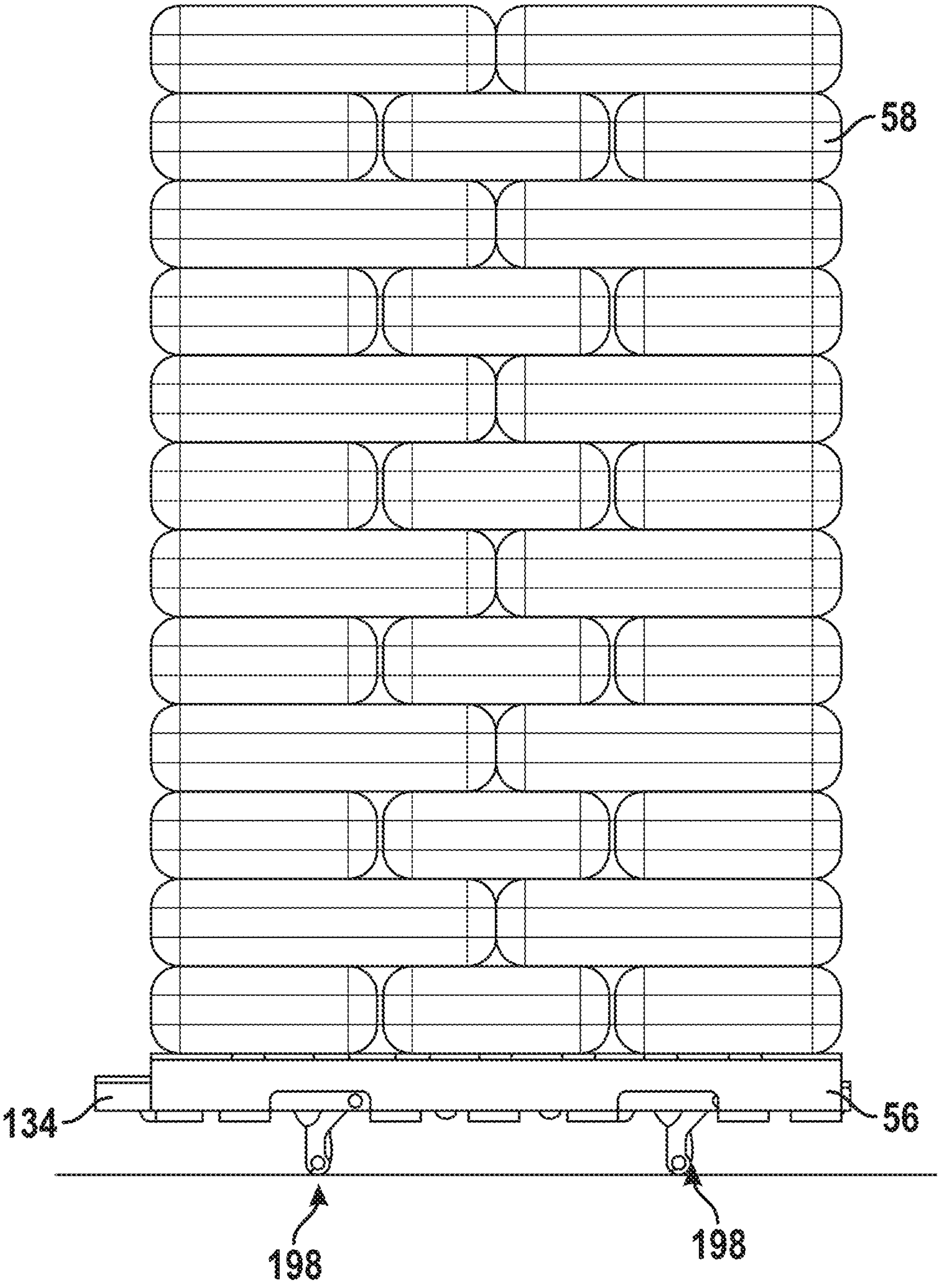
FIG. 11 is a side view of the lift assembly engaged with a pallet where the lift assembly is in the raised position.
Figure 12:
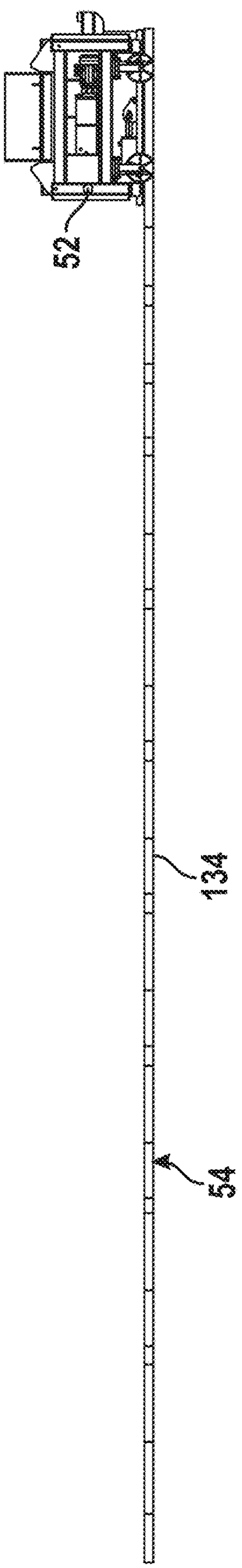
FIG. 12 is a side view of the loading and unloading apparatus of FIG. 1.

A contact wall 164 having a generally rectangular shape is transverse to the walls 160, 162 and is attached to front edge of each of the second support brackets 156 and rear edge of the first support brackets 154. The contact walls 164 on the front edges of the support brackets 156 contact the support structure (pallet 56) that is adjacent to the drive member 142 and the contact walls on the rear edges of the support brackets 154 contact the drive vehicle, such as the forklift 62, that is used to engage and move the transport assembly 52, which in turn, moves the lift assembly 54 carrying the pallets 56. Also, the main frame 64 of the transport assembly 52 is non-fixedly seated in the spaces 166 formed between the vertically extending walls 162 of the first and second support brackets 154, 156 to enable the drive member 142 to move upwardly and downwardly relative to the main frame 64 during the raising and lowering of the support members 134 between the raised position (FIG. 11) and the lowered position (FIG. 10).

Each of the drive members 142 also includes a hydraulic actuator unit 168 having a front end 170 and an opposing, rear end 172. The hydraulic actuator unit 168 includes a sealed cylinder 174 including a piston and hydraulic fluid (not shown). The front end 170 of the hydraulic actuator unit 168 is fixedly connected to a rod 176 extending between the second support brackets 156. The rear end 172 of each hydraulic actuator unit 168 includes an opening where a piston rod 178 attached to the piston head within the cylinder 174, has an end 180 that extends through the opening and is attached to the rod 176 extending between spaced plate brackets 182. The plate brackets 182 each include a slot 184 configured to receive opposing ends of the rod 176 and enable the position of the rod 176, and thereby the position of the piston rod 178, to be adjusted relative to the plate brackets 184. As shown, the opposing ends of the rod 176 are secured to the plate brackets 184 by a washer and a nut, or by any suitable fasteners. The bottom end 190 of the each of the plate brackets 184 partially extends through slots 192 formed in the top wall of the housing 144 and are attached to an actuator plate 194 (FIG. 7) positioned within the housing 144.

Referring to FIGS. 4-8, the actuator plate 194 has a planar body that is integrally formed by a suitable metal forming process. As shown, the actuator plate 194 is positioned below the top wall 146 of the housing 144, where the width between the outer surfaces of the actuator plate 194 is less than the distance between the opposing sidewalls 148, 150 of the housing 148 so that the actuator plate 194 is able to move relative to the housing 148. The rear end 196 of the actuator plate 194 is positioned at a distance from the end wall 152 of the drive member 142 to enable the actuator plate 194 to move forward and backward relative to the housing 144. In the illustrated embodiment, the hydraulic actuator units 168 are activated to cause the plate brackets 182 to move toward the end wall 152 of the drive member 142, thereby pulling the actuator plate 194 toward the rear end of the drive member 152. When the hydraulic actuator units 168 are deactivated, the plate brackets 182 move toward the front end of the drive member 142, thereby pushing the actuator plate 194 toward the front end of the drive member 142.

As shown in FIGS. 1 and 4, the drive member 142 includes at least one, and preferably three roller assemblies 198 that are spaced from each other along the length (from the front end to the rear end) of the drive member 142, where each of the roller assemblies 198 includes first arms 200 and second arms 202 that are laterally spaced from each other. In the illustrated embodiment, first ends 204 of the first arms 200 are connected to a first rod 206, where the first rod 206 partially extends through through-holes 208 in the first ends 204 and through-holes 210 in outer flanges 212 extending from a bottom surface of the actuator plate 194. As shown, the outer ends of the first rod 206 are secured by pins 216, such as cotter pins, clevis pins or other suitable spring pins or spring collars, to limit the lateral movement of the rod. Second ends 218 of the first arms 200 are connected to mounting posts 220 extending from opposing ends of main roller 222. Similarly, first ends 224 of the second arms 202 have through-holes 226 that align with corresponding through-holes in the sidewalls 148, 150 of the housing 144, where a second rod 228 extends through the through-holes and is secured in place by pins, such as cotter pins, clevis pins or other suitable spring pins or spring collars. Second ends 232 of the second arms 202 are connected to the mounting posts 220 extending from opposing ends of a main roller 222. The mounting posts 220 partially extend through through-holes in the second ends 218 of the first arms 200 and the second arms 202 and are secured to the second ends 218 by a pin or a collar as described above.

The first ends 204 of the first arms 200 are connected to the actuator plate 194 so that the first ends 204 simultaneously move forward and backward with the movement of the actuator plate 194. The second rod 228 forms a pivot point such that the first ends 224 of the second arms 202 are rotatably or pivotably connected to the housing 142 by the second rod 228 and rotate or pivot about the second rod. Similarly, the second ends 218, 232 of the first arms 200 and the second arms 202 rotate or pivot about the ends of the main roller 222.

In operation, when the actuator plate 194 is pulled toward the end wall 152 of the drive member 142 as described above, the first ends 204 of the first arms 200 also moves toward the end wall causing the first ends 224 of the second arms 202 to pivot about the second rod 228 and move the second ends 218, 232 and the main roller 222 to move downwardly away from the housing 144 and push against an underlying surface to raise the housing 144 away from the underlying surface. When the actuator plate 194 moves toward the front end of the drive member 142, the first ends 204 of the first arms 200 also move toward the front end of the drive member 142, causing the second ends 218, 232 of the first arms 200 and the second arms 202 and the main roller 222 to move upwardly toward the housing 144, thereby lowering the drive member 142 toward the underlying surface.

The actuator plate 194 also includes plate wheels 234 that have through-holes 236 that align with through-holes in the outer flanges 212 and inner flanges 240 extending from the bottom surface of the actuator plate 194, where each of the plate wheels 234 are secured by a first axle 242 that extends through the aligned through-holes 236, 238 and where a pin 244, such as a cotter pin or similar fastener, is attached to the ends of the first axle 242 to limit the lateral movement of the first axle. As shown, a portion of the plate wheels 234 extends above the top surface 246 of the actuator plate 194 and rolls along the bottom surface 248 of the top wall 146 of the housing 144 so that the actuator plate 194 remains at a designated distance from the bottom surface of the top wall 146 to prevent the actuator plate 194 from contacting the top wall 146 and help reduce wear on the actuator plate and to help prevent the actuator plate from getting contacting and getting stuck on the housing 144 during operation.

Additionally, the actuator plate 194 includes a plurality of ground wheels 250 that have through-holes 252 that align with through-holes 254 in the outer flanges 212 and inner flanges 240 extending from the bottom surface of the actuator plate 194, where each of the ground wheels 250 are secured by a second axle 252 that extends through the aligned through-holes 252, 254 and where a pin 244, such as a cotter pin or similar fastener, is attached to the ends of the second axle 252 to limit the lateral movement of the second axle. As shown, a portion of the ground wheels 250 extends below the bottom surface 254 of the housing 144 so that the ground wheels 250 are spaced from the underlying surface when the drive member 142 is in the raised position and contact the underlying surface when the drive member 142 is in the lowered position. The ground wheels 250 are configured to roll along the underlying surface and over the bottom ends of the pallets 56 to enable the lift assembly 54 to readily move between locations and into and out of the pallets 56.

To maintain the position of the actuator plate 194 (and the actuator plates 278 and 305 described below) within the housing 144, a slot 256 is formed in the actuator plate above each of the roller assemblies 198. A roller flange 258 extends from a bottom surface of the top wall 146 of the housing 144 and through the slot 256. The roller flange 258 includes a through-hole 260 that aligns with a through-hole 262 in a positioning wheel 264. The positioning wheel 264 is rotatably attached to the roller flange 258 by inserting a fastener 266 through the aligned through-holes 260, 262 and secured by fastener 266 or other suitable connector. The roller flange 258 moves between the opposing ends of the slot 256 while the positioning wheel 264 rolls along the bottom surface 254 of the actuator plate 194 during the raising and lowering of the support members 134, to support the actuator plate 194 and to help prevent the actuator plate from moving vertically within the housing 144. It should be appreciated that the drive member 142 may have one positioning wheel 264 or a plurality of the positioning wheels 264.

A plurality of intermediate members 140 are interconnected to each other and connected to the drive member 142. The number of intermediate members 140 that are connected to the drive member 142 depends on the number of the pallets 56 associated with the consolidated unit 60 that will be moved and raised by the lift assembly 54. In an embodiment, one intermediate member 140 is connected to the drive member 142. In another embodiment, two or more of the intermediate members 140 are connected to the drive member 142.

Each of the intermediate members 140 includes a housing 272 having a top wall 274 and opposing sidewalls 276 that are integrally formed together, welded together or connected together by suitable fasteners. Each of the intermediate members 140 includes an intermediate actuator plate 278 and two of the roller assemblies 198 attached to the intermediate actuator plate 278 as described above with respect to the drive member 142. It should be appreciated that the intermediate members 140 may include one of the roller assemblies 198 or a plurality of the roller assemblies 198. Also as described above, the intermediate actuator plate 278 includes inner flanges 280 and outer flanges 282 that extend from a bottom surface of the intermediate actuator plate 278. At least two of the plate wheels 234 and a plurality of the ground wheels 250 are rotatably attached to the inner and outer flanges 280, 282 and are secured by a pin 244. The intermediate actuator plate 278 also includes front and rear inner and outer flanges 280, 282 extending from the bottom of the intermediate actuator plate 278 respectively at a first end or front end 284 and at a second end or rear end 286 of the intermediate actuator plate 278 as shown in FIGS. 7A to 7I. At least one plate wheel 234 and at least two ground wheels 250 are rotatably attached to the front inner and outer flanges 280, 282 and to the rear inner and outer flanges 280, 282 as described above.

Figure 8:
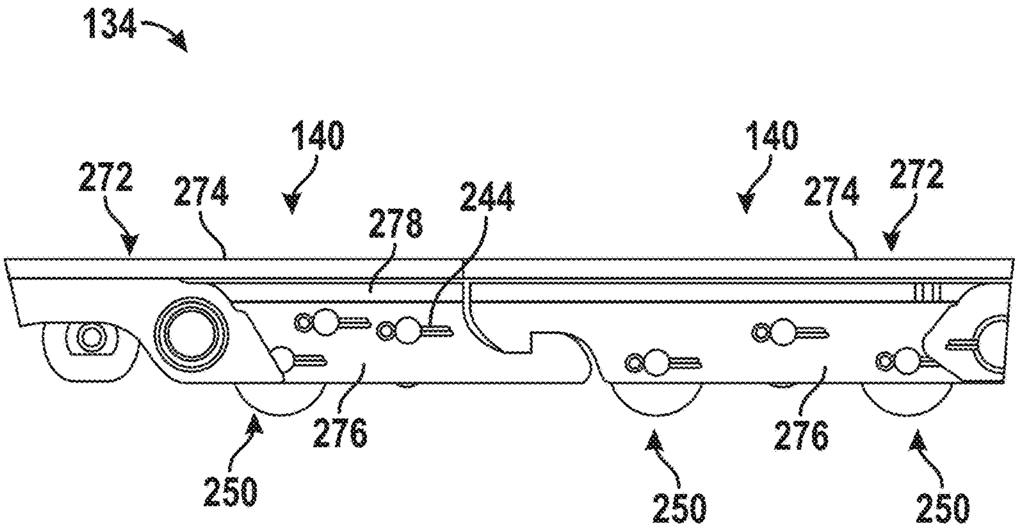
FIG. 8 is a side view of intermediate members of the lift assembly that are connected together.

Each intermediate actuator plate 278 also includes an upwardly projecting hook member 288 or a downwardly projecting hook member 290 at the front end 284 and the rear end 286 of the intermediate actuator plate. The upwardly projecting hook member 288 and the downwardly projecting hook member 290 each include a hook 289, 291 and a recess 293 and 295. To securely attach the intermediate actuator plates 278 together and one of the intermediate actuator plates 278 to the drive member 142, the hook 289 of the upwardly projecting hook member 288 matingly engages the recess 295 of the downwardly projecting hook member 290, and the hook 291 of the downwardly projecting hook member 290 matingly engages the recess 293 of the upwardly projecting hook member 288 as shown in FIG. 8. In this way, the actuator plate 194 of the drive member 142 is securely connected to the intermediate actuator plates 278 of each of the intermediate members 140 to simultaneously move the actuator plates 194, 278 in a forward or rearward direction. The raising and lowering of the intermediate members 140 by the wheel assemblies 70 is the same as described above for the drive member 142. In operation, the drive member 142 simultaneously moves all of the actuator plates 194, 278 to move the wheel assemblies 70, and thereby raise and lower the drive member 142 and the intermediate members 140.

Figure 9:
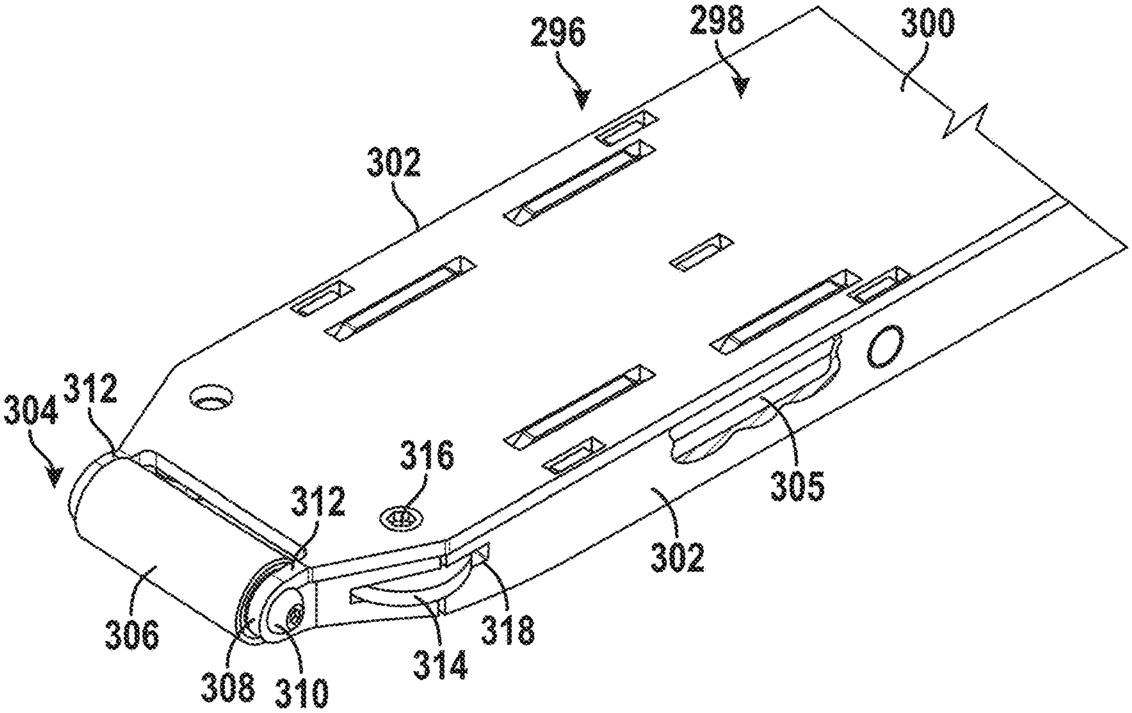
FIG. 9 is a fragmentary perspective view of an end member of the loading and unloading apparatus of FIG. 1.

Referring to FIGS. 1 and 9, the support members 134 each include an end member 296 having a housing 298 formed by a top wall 300 and opposing sidewalls 302 that are integrally formed together, welded together or attached together by suitable fasteners. The end member 296 is the same as the intermediate member 140 except that an end, i.e., the front end 304 includes guide rollers such as vertical guide roller 306 supported by an axle 308 where the ends of the axle 308 extend through through-holes 310 in spaced roller brackets 312 on the end the housing 298. The vertical guide roller 306 rotates in a clockwise or counterclockwise direction and helps the front end 304 of each end member 296 roll along a vertical wall of a container when the lift assembly 54 is moving raised or lowered inside of a container. Also, each sidewall 302 of the end member 296 includes a lateral guide roller 314 that are adjacent to the vertical guide roller 306 and are rotatably attached to a post 316 secured to the housing 298. The lateral guide rollers 314 rotate in a clockwise or counterclockwise direction about vertical longitudinal axes, where a portion of each of the lateral guide rollers 314 extends through slots 318 formed in the sidewalls 302. This enables the lateral guide rollers 314 to contact and roll along the inner surfaces of the sidewalls of a container to help facilitate movement of the lift assembly 54 into and out of a container or similar storage container or shipping container. It should be appreciated that the end member 296 may have one lateral guide roller 314 or a plurality of lateral guide rollers 314 on the sidewalls 302. In this embodiment, the end member includes an end actuator plate 305 that is connected to the intermediate actuator plate 278 of the adjacent intermediate member 140 and moves relative to the housing 298, and roller assemblies 198 that operate as described above.

Referring to FIGS. 12-18, in operation, a drive vehicle, such as forklift 62, aligns the forks 320 with the fork openings 322 on the rear end of the transport assembly 52 and moves the forklift 62 toward the transport assembly 52 until the fork support 324 contacts the rear end of the transport assembly 52. The fork support 324 and forks 320 are then lowered so that the bottom of the fork support 324 is positioned between the stop member 132 of the transport connector 129 and the rear end of the transport assembly 52. This helps to maintain the connection between the forklift 62 and the transport assembly 52 during movement.

Once the forklift 62 is connected to the transport assembly 52, the forklift 62 moves the transport assembly 52 and the lift assembly 54 toward a consolidated unit 60 consisting of a plurality of support structures, such as pallets 56, where the pallets 56 are each holding a plurality of products. The support members 134 are aligned with the through-holes at the bottom of the pallets 56 and then the forklift 62 moves the forks 320 into and through the through-holes at the bottom of each of the pallets 56 until the front end of the lift assembly 54 exits the through-holes on the last pallet 56, i.e., the pallet furthest from the forklift. As the support members 134 of the lift assembly 54 move through the through-holes in the pallets 56, the ground wheels 250 and lateral guide rollers 314 engage and roll along corresponding surfaces on the pallets 62 to facilitate movement of the support members 134 through the through-holes in the pallets 56. After the fork support 324 of the forklift 62 is adjacent to the first pallet 56, i.e., the pallet closest to the forklift, the forklift 62 begins the process of raising the consolidated unit 60 of pallets 56.

To raise the consolidated unit 60 of pallets 56, an operator in the forklift 62, activates a button or switch on the forklift control panel 326 (FIG. 13), which causes a wireless transceiver 328 to send a signal to a receiver 330 on the transport assembly 52 to raise the support members 134. After the receiver 320 receives the signal, the hydraulic power units 126 activate the hydraulic actuator units 168 to pull the interconnected actuator plates 194, 278 and 305 within the support members 134, toward the rear end of the transport assembly 52 (toward the forklift 62). Pulling the interconnected actuator plates, causes the roller assemblies 198 to move from a first position or lowered position to a second position or raised position, in which the pallets 56 and products of the consolidated unit 60 are raised away from the underlying surface. Once in the raised position, the forklift 62 moves the consolidated unit 60 to a desired location within a facility or within a storage or shipping container of a transport vehicle, such as a truck.

After the consolidated unit 60 is at the desired location or completely moved into the container, the operator again activates the button or switch on the control panel 326, which sends a signal from the transceiver 328 on the forklift 62 to the receiver 330 on the transport assembly 52, to lower the support members 134 of the lift assembly 54, and thereby the consolidated unit 60. The roller assemblies 198 move toward the support members 134, which causes the support members 134 to move toward the underlying surface until the lift assembly 54 is in the lowered position. Once in the lowered position, the forklift 62 moves away from the consolidated unit 60, which causes the support members 134 of the lift assembly 54 to move outwardly through the through-holes of the pallets 56 until the support members 134 are completely removed from the through-holes of the pallets 56. The forklift 62 may now be used to move another consolidated unit 60 within a facility or into the same storage container or a different storage container.

To remove a consolidated unit 60 of pallets 56 from a container, such as a storage container, the forklift 62 aligns the support members 134 of the lift assembly 54 with the through-holes of the pallets 56 of the consolidated unit 60 and then moves the support members 134 through the through-holes until the fork support 324 is engaged with the transport connector 129 and the front ends of the support members 134 are at least partially through the last pallet 56 of the consolidated unit 60. The operator of the forklift 62 then activates the button or switch on the control panel 326, which sends a lift signal from the transceiver 328 to the receiver 330 on the transport assembly 52. This causes the hydraulic power units 126 to activate the hydraulic actuator units 168 associated with the support members 134 to move the support members 134 from the lowered position to the raised position. Once in the raised position, the forklift 62 moves the consolidated unit 60 of pallets 56 out of the storage container to another location within the facility, into another storage container or to any suitable location.

As described above, the present loading and unloading apparatus 50 enables a user to move a large number of pallets 56 having products (a consolidated unit 60) simultaneously between locations and into and out of storage and shipping containers. Efficiently moving a plurality of pallets holding products at the same time, saves significant time and money over conventional methods of individually moving the same pallets with products.

While particular embodiments of the present loading and unloading apparatus is shown and described, it will be appreciated by those skilled in the art that changes and modifications may be made thereto without departing from the invention in its broader aspects and as set forth in the following claims.

What is claimed is:

1. A loading and unloading apparatus comprising:
a transport assembly;
a lift assembly including a plurality of support members, wherein each of the support members is attached to the transport assembly, each of said support members including an actuator plate;
a plurality of roller assemblies movably attached to said support members and said actuator plates, wherein said roller assemblies move relative to said support member to move said lift assembly between a raised position and a lowered position,
wherein said actuator plates are moved by said transport assembly in a first direction which raises said support members to the raised position,
wherein said actuator plates are moved by said transport assembly in a second direction opposite the first direction which lowers said support members to the lowered position,
wherein a drive vehicle engages said transport assembly to move said support members of said lift assembly through through-holes of a plurality of support structures holding products configured as a consolidated unit, until said transport assembly engages a first support structure of said consolidated unit,
wherein said roller assemblies move in the first direction and raise said lift assembly to the raised position to raise the consolidated unit away from an underlying surface and move the consolidated unit to another location or into or out of a container, and
wherein said roller assemblies move in the second direction to lower said lift assembly to the lowered position to lower the consolidated unit toward the underlying surface and wherein the drive vehicle moves the transport assembly and the lift assembly away from the consolidated unit to remove the lift assembly from the consolidated unit.

2. The loading and unloading apparatus of claim 1, wherein each of said roller assemblies includes a first arm and a second arm, a first end of said first arm is attached to one of said actuator plates of one of said support members and a second end of said first arm is attached to a main roller, and a first end of said second arm is fixed to a housing of one of said support members and a second end of said second arm is attached to said main roller,
wherein said one of said actuator plates is moved by said transport assembly in the first direction, which causes said first end of said first arm to move toward said second arm and raise said one of said support members to the raised position, and
wherein said one of said actuator plates is moved by said transport assembly in the second direction, which causes said first end of said first arm to move away from said second arm and lower said one of said support members to the lowered position.

3. The loading and unloading apparatus of claim 1, wherein said actuator plates of said support members each include a plurality of plate wheels that extend partially above top surfaces of said actuator plates and engage and roll along bottom surfaces of top walls of housings of said support members to help facilitate movement of said actuator plates relative to said housings of said support members.

4. The loading and unloading apparatus of claim 3, wherein said actuator plates of said support members each include a plurality of ground wheels that extend partially below bottom surfaces of said housings and engage and roll along an underlying support surface to help facilitate movement of said support members on the underlying surface.

5. The loading and unloading apparatus of claim 1, wherein said actuator plates of said support members each include a plurality of ground wheels that extend partially below bottom surfaces of said housings and engage and roll along an underlying support surface to help facilitate movement of said support members on the underlying surface.

6. The loading and unloading apparatus of claim 1, wherein said support members each include a drive member attached to said transport assembly and a plurality of intermediate members that are connected together to a predetermined length that corresponds to a length of said consolidated unit, wherein one of said intermediate members is attached to said drive member, and wherein each of said intermediate members includes intermediate actuator plates and said drive member includes a drive actuator plate such that said intermediate actuator plates and said drive actuator plate are coupled to each other to form said actuator plate.

7. The loading and unloading apparatus of claim 1, further comprising an end support member that is connected to a front end of each of said support members, said end support member including an end having a vertical guide roller and opposing sides each including a lateral guide roller.

8. The loading and unloading apparatus of claim 1, wherein the transport assembly includes a plurality of hydraulic cylinders and a plurality of hydraulic power units, each of said hydraulic power units being coupled to one of said plurality of hydraulic cylinders and configured to provide power to said plurality of hydraulic cylinders, said plurality of hydraulic cylinders each being connected to one of said actuator plates of said support members and configured to move said actuator plates forward and rearward.

9. The loading and unloading apparatus of claim 8, further comprising a battery pack attached to said transport assembly, said battery pack configured to provide power to said hydraulic power units.

10. The loading and unloading apparatus of claim 9, wherein said battery pack includes at least one rechargeable battery.

11. The loading and unloading apparatus of claim 1, wherein said transport assembly includes a transport connector having a base and a stop member extending transversely from said base, wherein said stop member engages a drive vehicle to connect the drive vehicle to said transport assembly.

12. A loading and unloading apparatus comprising:
a transport assembly including a frame;
a lift assembly including support members each having a plurality of interconnected intermediate members and a drive member connected to one of said intermediate members, each of said intermediate members including a housing and an intermediate actuator plate that moves relative to said housing, and said drive member including a drive actuator plate, wherein said intermediate actuator plates and said drive actuator plate are coupled together to form an actuator plate in each of said support members;
a plurality of roller assemblies movably attached to said support members, wherein said plurality of roller assemblies move said lift assembly between a raised Position and a lowered position;

wherein said actuator plates are moved by said transport assembly in a first direction which raises said support members to the raised position, wherein said actuator plates are moved by said transport assembly in a second direction opposite the first direction which lowers said support members to the lowered position, wherein when said lift assembly is in the lowered position, a drive vehicle engages said transport assembly to move said support members of said lift assembly through through-holes of a plurality of support structures holding products configured as a consolidated unit, until said transport assembly engages a first support structure of said consolidated unit, wherein said roller assemblies move said lift assembly to the raised position to raise the consolidated unit away from an underlying surface and enable the drive vehicle to move the consolidated unit to another location or into or out of a container, and wherein said roller assemblies move said lift assembly to the lowered position to lower the consolidated unit to the underlying surface to enable the drive vehicle to move the lift assembly away from the consolidated unit and remove the consolidated unit from the lift assembly.

13. The loading and unloading apparatus of claim 12, wherein each of said roller assemblies includes a first arm and a second arm, a first end of said first arm is attached to one of said actuator plates of one of said support members and a second end of said first arm is attached to a main roller, and a first end of said second arm is fixed to a housing of one of said support members and a second end of said second arm is attached to said main roller, wherein said one of said actuator plates is moved by said transport assembly in the first direction, which causes said first end of said first arm to move toward said second arm and raise said one of said support members to the raised position, and wherein said one of said actuator plates is moved by said transport assembly in the second direction, which causes said first end of said first arm to move away from said second arm and lower said one of said support members to the lowered position.

14. The loading and unloading apparatus of claim 12, wherein said actuator plates of said support members each include a plurality of plate wheels that extend partially above top surfaces of said actuator plates and engage and roll along bottom surfaces of top walls of housings of said support members to help facilitate movement of said actuator plates relative to said housings of said support members.

15. The loading and unloading apparatus of claim 14, wherein said actuator plates of said support members each include a plurality of ground wheels that extend partially below bottom surfaces of said housings and engage and roll along an underlying support surface to help facilitate movement of said support members on the underlying surface.

16. The loading and unloading apparatus of claim 12, wherein said actuator plates of said support members each include a plurality of ground wheels that extend partially below bottom surfaces of said housings and engage and roll along an underlying support surface to help facilitate movement of said support members on the underlying surface.

17. The loading and unloading apparatus of claim 12, wherein said plurality of intermediate members are connected together to a predetermined length that corresponds to a length of said consolidated unit.

18. The loading and unloading apparatus of claim 12, further comprising an end support member that is connected to a front end of each of said support members, said end support member including an end having a vertical guide roller and opposing sides each including a lateral guide roller.

19. The loading and unloading apparatus of claim 12, wherein the transport assembly includes a plurality of hydraulic cylinders and a plurality of hydraulic power units, each of said hydraulic power units being coupled to one of said plurality of hydraulic cylinders and configured to provide power to said plurality of hydraulic cylinders, said plurality of hydraulic cylinders each being connected to one of said actuator plates of said support members and configured to move said actuator plates forward and rearward.

20. The loading and unloading apparatus of claim 19, further comprising a battery pack attached to said transport assembly, said battery pack configured to provide power to said hydraulic power units.

21. The loading and unloading apparatus of claim 20, wherein said battery pack includes at least one rechargeable battery.

22. The loading and unloading apparatus of claim 12, wherein said transport assembly includes a transport connector having a base and a stop member extending transversely from said base, wherein said stop member engages a drive vehicle to connect the drive vehicle to said transport assembly.

* * * * *